(12) United States Patent
Li et al.

(10) Patent No.: US 11,894,573 B2
(45) Date of Patent: Feb. 6, 2024

(54) BATTERY, APPARATUS, AND PREPARATION METHOD AND PREPARATION APPARATUS OF BATTERY

(71) Applicant: CONTEMPORARY AMPEREX TECHNOLOGY CO., LIMITED, Ningde (CN)

(72) Inventors: Quanguo Li, Ningde (CN); Yonghuang Ye, Ningde (CN); Chengdu Liang, Ningde (CN); Haizu Jin, Ningde (CN); Qian Liu, Ningde (CN); Xia Hu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/985,813

(22) Filed: Nov. 11, 2022

(65) Prior Publication Data
US 2023/0070894 A1 Mar. 9, 2023

Related U.S. Application Data

(63) Continuation of application No. PCT/CN2020/119737, filed on Sep. 30, 2020.

(51) Int. Cl.
*H01M 10/48* (2006.01)
*H01M 50/342* (2021.01)
(Continued)

(52) U.S. Cl.
CPC ..... *H01M 50/3425* (2021.01); *H01M 10/486* (2013.01); *H01M 10/613* (2015.04); *H01M 50/375* (2021.01); *H01M 2220/20* (2013.01)

(58) Field of Classification Search
None
See application file for complete search history.

(56) References Cited

U.S. PATENT DOCUMENTS

| | | |
|---|---|---|
| 8,993,140 B2 | 3/2015 | Schiemann et al. |
| 9,083,065 B2 | 7/2015 | Carkner |

(Continued)

FOREIGN PATENT DOCUMENTS

| | | |
|---|---|---|
| CN | 101242011 B | 8/2008 |
| CN | 101262049 A | 9/2008 |

(Continued)

OTHER PUBLICATIONS

The World Intellectual Property Organization (WIPO) International Search Report and Written Opinion for PCT/CN2020/119737 dated Jul. 2, 2021 15 pages (including English translation).

(Continued)

*Primary Examiner* — Lisa S Park
(74) *Attorney, Agent, or Firm* — ANOVA LAW GROUP, PLLC

(57) ABSTRACT

This application relates to the field of energy storage technologies, and provides a battery, an apparatus, a preparation method of battery, and a preparation apparatus of battery. The battery includes a first battery cell and a second battery cell. The first battery cell includes a first pressure relief mechanism, the second battery cell includes a second pressure relief mechanism, an energy density of the first battery cell is greater than an energy density of the second battery cell, and an area of the first pressure relief mechanism is greater than an area of the second pressure relief mechanism. The apparatus includes the foregoing battery.

18 Claims, 15 Drawing Sheets

(51) Int. Cl.
    *H01M 50/375*    (2021.01)
    *H01M 10/613*    (2014.01)

(56) References Cited

U.S. PATENT DOCUMENTS

| | | |
|---|---|---|
| 9,799,873 B2 | 10/2017 | Kohlberger |
| 9,882,197 B2 | 1/2018 | Wang et al. |
| 10,128,528 B2 | 11/2018 | Zhang et al. |
| 10,153,636 B1 | 12/2018 | Vander Lind et al. |
| 10,177,423 B2 | 1/2019 | Heeg et al. |
| 10,434,894 B2 | 10/2019 | Li et al. |
| 10,587,001 B2 | 3/2020 | Park |
| 10,673,103 B2 | 6/2020 | Hoshina et al. |
| 10,907,981 B2 | 2/2021 | Li et al. |
| 2003/0068557 A1 | 4/2003 | Kumashiro et al. |
| 2006/0197496 A1 | 9/2006 | Iijima et al. |
| 2007/0072059 A1 | 3/2007 | Kitao et al. |
| 2008/0067972 A1 | 3/2008 | Takami et al. |
| 2008/0241666 A1 | 10/2008 | Baba et al. |
| 2009/0162751 A1 | 6/2009 | Honbo et al. |
| 2010/0136391 A1* | 6/2010 | Prilutsky ........... H01M 10/6566 429/62 |
| 2010/0304206 A1 | 12/2010 | Nakashima et al. |
| 2011/0086248 A1 | 4/2011 | Nakura |
| 2012/0074894 A1 | 3/2012 | Chen et al. |
| 2012/0126753 A1 | 5/2012 | Carkner |
| 2012/0164490 A1 | 6/2012 | Itoi et al. |
| 2012/0189885 A1* | 7/2012 | Kishii ................ H01M 50/51 429/82 |
| 2013/0089761 A1 | 4/2013 | Schiemann et al. |
| 2013/0337310 A1 | 12/2013 | Omura et al. |
| 2014/0020235 A1 | 1/2014 | Aramaki et al. |
| 2014/0087227 A1 | 3/2014 | Shih et al. |
| 2014/0181551 A1* | 6/2014 | Rahal-Arabi ......... G06F 1/3296 713/340 |
| 2014/0186659 A1 | 7/2014 | Dhar et al. |
| 2015/0132625 A1* | 5/2015 | Miyata .............. H01M 10/0525 429/94 |
| 2015/0188188 A1 | 7/2015 | Zhang et al. |
| 2015/0188207 A1 | 7/2015 | Son et al. |
| 2015/0280276 A1 | 10/2015 | Lemke et al. |
| 2015/0300538 A1 | 10/2015 | Al-Atat et al. |
| 2015/0303444 A1 | 10/2015 | Wang et al. |
| 2015/0357687 A1 | 12/2015 | Heeg et al. |
| 2015/0357688 A1 | 12/2015 | Heeg et al. |
| 2015/0372359 A1 | 12/2015 | Shih et al. |
| 2016/0099451 A1 | 4/2016 | Murai et al. |
| 2016/0126546 A1 | 5/2016 | Takami et al. |
| 2016/0200214 A1 | 7/2016 | Ishibashi et al. |
| 2016/0301045 A1 | 10/2016 | Tyler et al. |
| 2016/0301046 A1 | 10/2016 | Tyler et al. |
| 2016/0301117 A1 | 10/2016 | Tyler et al. |
| 2016/0329617 A1 | 11/2016 | Omura et al. |
| 2016/0380315 A1 | 12/2016 | Weicker et al. |
| 2017/0179535 A1 | 6/2017 | Murashi et al. |
| 2017/0346089 A1 | 11/2017 | Yamamoto et al. |
| 2017/0365886 A1 | 12/2017 | Hoshina et al. |
| 2018/0034023 A1* | 2/2018 | Newman ............... H01M 50/24 |
| 2018/0138478 A1* | 5/2018 | Chan .................. H01M 50/271 |
| 2018/0145383 A1 | 5/2018 | Krishnan et al. |
| 2018/0159101 A1* | 6/2018 | Tsang ................ H01M 50/152 |
| 2018/0212458 A1 | 7/2018 | Kawai et al. |
| 2018/0217218 A1 | 8/2018 | Huang et al. |
| 2019/0067658 A1* | 2/2019 | Fujiwara ............. H01M 50/213 |
| 2019/0074560 A1 | 3/2019 | Reimer et al. |
| 2019/0103625 A1* | 4/2019 | Haraguchi .......... H01M 50/578 |
| 2019/0225093 A1 | 7/2019 | Li et al. |
| 2019/0226859 A1 | 7/2019 | Li et al. |
| 2019/0267686 A1 | 8/2019 | Shimizu et al. |
| 2019/0334143 A1 | 10/2019 | Sugeno |
| 2019/0386269 A1 | 12/2019 | Tyler et al. |
| 2020/0014000 A1 | 1/2020 | Roddy et al. |
| 2020/0058968 A1 | 2/2020 | Thompson et al. |
| 2020/0106126 A1* | 4/2020 | Yokoshima ......... H01M 50/578 |
| 2020/0130511 A1 | 4/2020 | Botts et al. |
| 2020/0212526 A1 | 7/2020 | Wu et al. |
| 2020/0295325 A1 | 9/2020 | Tyler et al. |
| 2020/0313255 A1 | 10/2020 | Wu et al. |
| 2020/0321568 A1 | 10/2020 | Roddy et al. |
| 2021/0025723 A1 | 1/2021 | Li et al. |
| 2021/0050635 A1 | 2/2021 | Lee et al. |
| 2021/0074979 A1 | 3/2021 | Kwak et al. |
| 2021/0091428 A1 | 3/2021 | Naito et al. |
| 2021/0296721 A1* | 9/2021 | Omura ............... H01M 10/6556 |
| 2021/0328281 A1 | 10/2021 | Chu et al. |
| 2021/0391619 A1 | 12/2021 | Chang et al. |
| 2022/0069406 A1 | 3/2022 | Roddy et al. |
| 2022/0123375 A1 | 4/2022 | Liang et al. |
| 2022/0123427 A1* | 4/2022 | Ren ..................... H01M 50/394 |
| 2022/0320650 A1 | 10/2022 | Tyler et al. |
| 2022/0416330 A1 | 12/2022 | Li et al. |
| 2023/0061760 A1 | 3/2023 | Li et al. |
| 2023/0076751 A1 | 3/2023 | Xu et al. |
| 2023/0163296 A1 | 5/2023 | Li et al. |

FOREIGN PATENT DOCUMENTS

| | | |
|---|---|---|
| CN | 101409369 A | 4/2009 |
| CN | 101504977 A | 8/2009 |
| CN | 101635372 A | 1/2010 |
| CN | 101675555 A | 3/2010 |
| CN | 201749897 U | 2/2011 |
| CN | 102027617 A | 4/2011 |
| CN | 102447301 A | 5/2012 |
| CN | 202308227 U | 7/2012 |
| CN | 103311562 A | 9/2013 |
| CN | 104126238 A | 10/2014 |
| CN | 105006586 A | 10/2015 |
| CN | 105186066 A | 12/2015 |
| CN | 105849968 A | 8/2016 |
| CN | 105914804 A | 8/2016 |
| CN | 106207016 A | 12/2016 |
| CN | 206225503 U | 6/2017 |
| CN | 107004920 A | 8/2017 |
| CN | 107112603 A | 8/2017 |
| CN | 107256971 A | 10/2017 |
| CN | 206567773 U | 10/2017 |
| CN | 108598598 A | 9/2018 |
| CN | 208507849 U | 2/2019 |
| CN | 109428114 A | 3/2019 |
| CN | 208674305 U | 3/2019 |
| CN | 109659465 A | 4/2019 |
| CN | 110048151 A | 7/2019 |
| CN | 110065414 A | 7/2019 |
| CN | 110171236 A | 7/2019 |
| CN | 209071461 U | 7/2019 |
| CN | 110265591 A | 9/2019 |
| CN | 110265627 A | 9/2019 |
| CN | 110380144 A | 10/2019 |
| CN | 110444835 A | 11/2019 |
| CN | 110456275 A | 11/2019 |
| CN | 110678393 A | 1/2020 |
| CN | 210040332 U | 2/2020 |
| CN | 210403875 U | 4/2020 |
| CN | 111106277 A | 5/2020 |
| CN | 111106278 A | 5/2020 |
| CN | 111446488 A | 7/2020 |
| CN | 111584792 A | 8/2020 |
| CN | 211295236 U | 8/2020 |
| CN | 111668409 A | 9/2020 |
| CN | 211629259 U | 10/2020 |
| CN | 111900294 A | 11/2020 |
| DE | 102012215495 A1 | 3/2014 |
| DE | 202017104111 U1 | 10/2018 |
| DE | 102017212223 A1 | 1/2019 |
| EP | 1265302 A2 | 12/2002 |
| EP | 3193402 A1 | 7/2017 |
| EP | 3261161 A1 | 12/2017 |
| EP | 3316391 A1 | 5/2018 |
| EP | 3358706 A1 | 8/2018 |
| EP | 3675218 A1 | 7/2020 |
| EP | 3926724 A2 | 12/2021 |
| JP | H07320775 A | 12/1995 |
| JP | 2003174734 A | 6/2003 |

(56) References Cited

FOREIGN PATENT DOCUMENTS

| | | |
|---|---|---|
| JP | 2004342580 A | 12/2004 |
| JP | 2005071917 A | 3/2005 |
| JP | 2007059145 A | 3/2007 |
| JP | 2008226518 A | 9/2008 |
| JP | 2009021223 A | 1/2009 |
| JP | 2010250984 A | 11/2010 |
| JP | 2011065906 A | 3/2011 |
| JP | 2012113899 A | 6/2012 |
| JP | 2012234696 A | 11/2012 |
| JP | 2013209688 A | 10/2013 |
| JP | 2014072025 A | 4/2014 |
| JP | 2014112463 A | 6/2014 |
| JP | 2015018706 A | 1/2015 |
| JP | 2015133169 A | 7/2015 |
| JP | 2015170591 A | 9/2015 |
| JP | 2015530858 A | 10/2015 |
| JP | 2015204247 A | 11/2015 |
| JP | 2015211025 A | 11/2015 |
| JP | 2017139844 A | 8/2017 |
| JP | 2019129149 A | 8/2019 |
| JP | 2019139879 A | 8/2019 |
| JP | 2020035692 A | 3/2020 |
| JP | 2023509197 A | 3/2023 |
| JP | 2023509198 A | 3/2023 |
| WO | 2004095611 A1 | 11/2004 |
| WO | 2011114349 A2 | 9/2011 |
| WO | 2012014418 A1 | 2/2012 |
| WO | 2012060031 A1 | 5/2012 |
| WO | 2013031613 A1 | 3/2013 |
| WO | 2013069308 A1 | 5/2013 |
| WO | 2013099293 A1 | 7/2013 |
| WO | 2014045569 A1 | 3/2014 |
| WO | 2017191679 A1 | 11/2017 |
| WO | 2019123903 A1 | 6/2019 |
| WO | 2019161751 A1 | 8/2019 |
| WO | 2019187313 A1 | 10/2019 |
| WO | 2020133659 A1 | 7/2020 |
| WO | 2020134054 A1 | 7/2020 |
| WO | 2022067808 A1 | 4/2022 |
| WO | 2022067809 A1 | 4/2022 |
| WO | 2022067810 A1 | 4/2022 |

OTHER PUBLICATIONS

The China National Intellectual Property Administration (CNIPA) The First Office Action for Chinese Application 202080054659.9 dated Jun. 24, 2023 14 Pages (With Translation).
The China National Intellectual Property Administration (CNIPA) The First Office Action for Chinese Application 202080054687.0 dated Jul. 24, 2023 14 Pages (With Translation).
The United States Patent and Trademark Office (USPTO) The Non-Final Office Action for U.S. Appl. No. 17/970,603, dated Jul. 19, 2023 19 Pages.
The European Patent Office (EPO) Extended Search Report for EP Application No. 20955830.3 dated Mar. 30, 2023 8 Pages.
The World Intellectual Property Organization (WIPO) International Search Report and Written Opinion for PCT/CN2020/119738 dated Jun. 25, 2021 17 pages (including English translation).
The United States Patent and Trademark Office (USPTO) The office action for 18053493 dated Mar. 9, 2023 33 Pages.
The United States Patent and Trademark Office (USPTO) The office action for 17985813 dated Mar. 8, 2023 21 Pages.
The World Intellectual Property Organization (WIPO) International Search Report and Written Opinion for PCT/CN2020/129475 dated Aug. 16, 2021 13 pages (including English translation).
The United States Patent and Trademark Office (USPTO) The office action for 17985851 dated Mar. 22, 2023 13 Pages.
The World Intellectual Property Organization (WIPO) International Search Report and Written Opinion for PCT/CN2020/139180 dated Sep. 29, 2021 13 pages (including English translation).
The European Patent Office (EPO) Extended Search Report for EP Application No. 20947817.1 dated Nov. 30, 2022 7 Pages.
The World Intellectual Property Organization (WIPO) International Search Report and Written Opinion for PCT/CN2020/105474 dated Apr. 26, 2021 15 pages (including English translation).
Chengyi Lin et al., "General rules for analytical scanning electron microscopy", Jan. 23, 1997. JY/T 010-1996.
"Particle size analysis-Laser diffraction methods", Feb. 26, 2016. GB/T 19077-2016/ ISO 13320:2009.
The European Patent Office (EPO) Extended Search Report for EP Application No. 20947010.3 dated Jan. 25, 2023 9 Pages.
The China National Intellectual Property Administration (CNIPA) The First Office Action for Chinese Application 202010786641.X dated Oct. 26, 2022 16 Pages (With Translation).
The European Patent Office (EPO) Extended Search Report for EP Application No. 21789597.8 dated Nov. 16, 2022 11 Pages.
The European Patent Office (EPO) Extended Search Report for EP Application No. 21789597.8 dated Aug. 12, 2022 13 Pages.
The India Intellectual Proprty Office (INPO) Examination Report for IN Application No. 202217009095 dated Dec. 16, 2022 6 Pages.
The World Intellectual Property Organization (WIPO) International Search Report and Written Opinion for PCT/CN2021/089665 dated Jul. 30, 2021 17 pages (including English translation).
The China National Intellectual Property Administration (CNIPA) The First Office Action for Chinese Application 202010786523.9 dated Oct. 24, 2022 17 Pages (With Translation).
The China National Intellectual Property Administration (CNIPA) The Second Office Action for Chinese Application 202010786523.9 dated Feb. 28, 2023 10 Pages (With Translation).
The European Patent Office (EPO) Extended Search Report for EP Application No. 21790065.3 dated Nov. 18, 2022 11 Pages.
The European Patent Office (EPO) Extended Search Report for EP Application No. 21790065.3 dated Aug. 18, 2022 13 Pages.
The World Intellectual Property Organization (WIPO) International Search Report and Written Opinion for PCT/CN2021/089319 dated Jul. 26, 2021 14 pages (including English translation).
The World Intellectual Property Organization (WIPO) International Search Report and Written Opinion for PCT/CN2021/109686 dated Apr. 25, 2022 12 pages (including English translation).
The United States Patent and Trademark Office (USPTO) The office action for 18149672 dated May 30, 2023 7 Pages.
The World Intellectual Property Organization (WIPO) International Search Report and Written Opinion for PCT/CN2020/119736 dated Apr. 28, 2021 17 pages (including English translation).
The United States Patent and Trademark Office (USPTO) The Application for U.S. Appl. No. 18/054,375, dated Nov. 10, 2022 44 Pages.
The United States Patent and Trademark Office (USPTO) The Application for U.S. Appl. No. 17/970,603, dated Oct. 21, 2022 51 Pages.
The United States Patent and Trademark Office (USPTO) Non-final Office Action U.S. Appl. No. 18/054,375, dated Aug. 24, 2023 41 Pages.
Japan Patent Office (JPO) The Notice of Reasons for Refusal For JP Application No. 2022-542009 dated Sep. 4, 2023 6 Pages (Translation Included).
The European Patent Office (EPO) The Extended Search Report for EP Application No. 20961838.8, dated Aug. 17, 2023 10 Pages.
Japan Patent Office (JPO) The Notice of Reasons for Refusal For JP Application No. 2022-539699 dated Jul. 31, 2023 8 Pages (Translation Included).
The European Patent Office (EPO) The Extended Search Report for EP Application No. 21937198.6 dated Aug. 14, 2023 7 Pages.
The European Patent Office (EPO) The Extended Search Report for EP Application No. 20955828.7, dated Sep. 27, 2023 6 Pages.
Japan Patent Office (JPO) The Notice of Reasons for Refusal for JP Application No. 2022-542013 dated Oct. 2, 2023 9 Pages (Translation Included).

* cited by examiner

BATTERY, APPARATUS, AND PREPARATION METHOD AND PREPARATION APPARATUS OF BATTERY

CROSS REFERENCE TO RELATED APPLICATION

This application is a continuation application of International Patent Application No. PCT/CN2020/119737, filed with China National Intellectual Property Administration on Sep. 30, 2020, which is incorporated herein by reference in its entirety.

TECHNICAL FIELD

This application relates to the field of energy storage technologies, and in particular, to a battery, an apparatus, a preparation method of battery, and a preparation apparatus of battery.

BACKGROUND

Energy conservation and emission reduction are keys to sustainable development in automobile industry. As such, due to the advantage of energy conservation and emission reduction, electric vehicles have become an important part for sustainable development in automobile industry. For electric vehicles, battery technology is an important factor related to their development. In the development of the battery technology, in addition to performance improvement, safety is another important issue of batteries. If safety of a battery cannot be guaranteed, the battery is unusable. Therefore, improving safety of the battery requires urgent attention in the battery technology.

SUMMARY

In view of the foregoing problem, embodiments of this application provide a battery, an apparatus, a preparation method of battery, and a preparation apparatus of battery, so as to improve safety of the battery.

To implement the foregoing objectives, the embodiments of this application provide the following technical solutions.

A first aspect of the embodiments of this application provides a battery, including:
 a first battery cell, where the first battery cell includes a first pressure relief mechanism, and the first pressure relief mechanism is configured to be actuated when internal pressure or temperature of the first battery cell reaches a threshold, to release the internal pressure of the first battery cell; and
 a second battery cell, where the second battery cell includes a second pressure relief mechanism, and the second pressure relief mechanism is configured to be actuated when internal pressure or temperature of the second battery cell reaches a threshold, to release the internal pressure of the second battery cell; where
 an energy density of the first battery cell is greater than an energy density of the second battery cell, and an area of the first pressure relief mechanism is greater than an area of the second pressure relief mechanism.

Compared with the prior art, the battery provided in the embodiments of this application has the following advantages.

In the battery provided in the embodiments of this application, the first pressure relief mechanism is disposed on the first battery cell, so that when the internal pressure or temperature of the first battery cell reaches the threshold, the first battery cell can release the internal pressure. The second pressure relief mechanism is disposed on the second battery cell, so that when the internal pressure or temperature of the second battery cell reaches the threshold, the second battery cell can also release the internal pressure. The energy density of the first battery cell is greater than the energy density of the second battery cell, and thermal failure reaction of the first battery cell is more violent than thermal failure reaction of the second battery cell. The area of the first pressure relief mechanism is limited to be greater than the area of the second pressure relief mechanism, so that the first battery cell with more violent failure reaction can release pressure effectively and timely by using the first pressure relief mechanism with a larger area, so as to effectively relieve a sharp rise in temperature of the first battery cell and effectively reduce a probability of chain reaction triggered by thermal failure of the first battery cell, thereby improving overall safety of the battery.

In some implementations, a ratio of the area A1 of the first pressure relief mechanism to the area A2 of the second pressure relief mechanism satisfies: $1.5 \leq A1/A2 \leq 4$, so that the first battery cell and the second battery cell both can release pressure effectively and timely, thereby improving safety of the battery.

In some implementations, a ratio of the energy density E1 of the first battery cell to the energy density E2 of the second battery cell satisfies $1.26 \leq E1/E2 \leq 2.14$, so as to guarantee the safety of the battery and increase capacity of the battery.

In some implementations, the first battery cell and the second battery cell are arranged alternately with n first battery cells followed by m second battery cells, where $n \geq 1$, and $m \geq 1$, so that the first cell and the second cell with different energy densities are spaced apart, which is conducive to slow down spread of heat diffusion and further improve the safety of the battery.

In some implementations, the battery further includes a discharge channel, where the discharge channel is disposed facing the first pressure relief mechanism and/or the second pressure relief mechanism, and the discharge channel is configured to collect emissions from the first battery cell when the first pressure relief mechanism is actuated, and/or collect emissions from the second battery cell when the second pressure relief mechanism is actuated. The discharge channel is disposed so that when the internal pressure or temperature of the first battery cell and the second battery cell reaches a threshold, the internal pressures of the first battery cell and the second battery cell can be released timely, making the battery safer to use.

In some implementations, the discharge channel is provided in a quantity of at least two, the discharge channels are spaced apart, and the first pressure relief mechanism and the second pressure relief mechanism are disposed facing the different discharge channels respectively. Emissions from the first battery cell and the second battery cell can all be discharged out of the battery effectively and timely, so as to effectively reduce the probability that the discharge channels are blocked by solid substances discharged by the first battery cell and the second battery cell, thereby improving safety of the battery.

In some implementations, the first battery cell is provided in a quantity of at least two, and the first pressure relief mechanisms of two adjacent ones of the first battery cells are disposed facing the different discharge channels respectively. In this way, the different first battery cells can discharge emissions through the different discharge channels respectively, so that emissions from the first battery cells can be discharged out of the battery effectively and timely. In addition, a probability of thermal failure of one first battery cell caused by thermal failure of an adjacent first battery cell can be effectively reduced, thereby relieving chain reaction of thermal failure and improving safety of the battery.

In some implementations, the second battery cell is provided in a quantity of at least two, and the second pressure relief mechanisms of two adjacent ones of the second battery cells are disposed facing the different discharge channels respectively. In this way, the different second battery cells can discharge emissions through the different discharge channels respectively, so that emissions from the second battery cells can be discharged out of the battery effectively and timely. In addition, a probability of thermal failure of one second battery cell caused by thermal failure of an adjacent second battery cell can be effectively reduced, thereby relieving chain reaction of thermal failure and improving safety of the battery.

In some implementations, the battery further includes a box body, where the box body has a plurality of walls, the plurality of walls are configured to enclose an accommodating cavity for accommodating the first battery cell and the second battery cell, a hollow cavity is provided in at least one of the plurality of walls, and the hollow cavity is configured to form the discharge channel. The box body is configured to protect the first battery cell and second battery cell that are placed in the accommodating cavity. The hollow cavity for forming the discharge channel is provided in at least one of the plurality of walls of the box body, so that when the internal pressure or temperature of the first battery cell and the second battery cell reaches a threshold, emissions from the first battery cell and the second battery cell can be discharged to the hollow cavity. Therefore, emissions from the first battery cell and the second battery cell during thermal failure can be discharged out of the battery effectively and timely, thereby improving safety of the battery.

In some implementations, the plurality of walls include a bottom wall, the bottom wall is configured to support the first battery cell and the second battery cell, and the bottom wall has a hollow cavity. In this way, emissions from the first battery cell are discharged downwards and enter the hollow cavity at the bottom through the first pressure relief mechanism, and emissions from the second battery cell are also discharged downwards and enter the hollow cavity at the bottom through the second pressure relief mechanism. With this arrangement of the battery, after the battery is placed in a battery compartment of a vehicle, the battery can discharge emissions to the bottom of the vehicle rather than discharging emissions to a passenger compartment located above the battery compartment, thereby further improving safety of the battery.

In some implementations, the at least one wall is configured to be broken when the first pressure relief mechanism and/or the second pressure relief mechanism is actuated, to cause emissions from the first battery cell and/or the second battery cell to pass through the at least one wall and enter the corresponding discharge channel. In this way, when the internal pressure or temperature of the first battery cell reaches a threshold, the first pressure relief mechanism of the first battery cell is actuated, and emissions in the first battery cell are discharged, and/or when the internal pressure or temperature of the second battery cell reaches a threshold, the second pressure relief mechanism of the second battery cell is actuated, and emissions in the second battery cell are discharged, the emissions discharged from the first battery cell and/or the second battery cell may act on the at least one wall of the box body, so that a part of the box body facing the first pressure relief mechanism and/or a part of the box body facing the second pressure relief mechanism is broken. The hollow cavity of the box body communicates with the first pressure relief mechanism and/or the second pressure relief mechanism, so that the emissions in the first battery cell and/or the second battery cell can be discharged to the discharge channel effectively and timely, thereby further improving safety of the battery.

In some implementations, the at least one wall is provided with a first through hole, the first through hole is configured to communicate with the discharge channel, to cause emissions from the first battery cell to enter the corresponding discharge channel through the first through hole when the first battery cell and/or the second battery cell is actuated. In this way, when the internal pressure or temperature of the first battery cell reaches a threshold, the first pressure relief mechanism of the first battery cell is actuated, and emissions in the first battery cell is discharged, and/or internal pressure or temperature of the second battery cell reaches a threshold, the second pressure relief mechanism of the second battery cell is actuated, and emissions in the second battery cell is discharged, the emissions discharged from the first battery cell and/or the second battery cell enter the hollow cavity of the box body through the first through hole, so that the emissions in the first battery cell and/or the second battery cell can be discharged to the discharge channel effectively and timely, thereby further improving safety of the battery.

In some implementations, the battery further includes a thermal management part, configured to accommodate fluid to adjust temperature of the first battery cell and the second battery cell, where the thermal management part is disposed between the first battery cell and second battery cell and at least one wall, and the thermal management part is configured to be broken when the first pressure relief mechanism and/or the second pressure relief mechanism is actuated, to cause the fluid to flow out. In this way, the emissions from the first battery cell and/or the second battery cell can enter the discharge channel through the broken thermal management part, and fluid can flow out due to breakage of the thermal management part, thereby rapidly reducing the internal temperature of the battery through the fluid, helping to relieve chain reaction of thermal failure, and improving safety of the battery.

In some implementations, the thermal management part is provided with a second through hole, and the second through hole is configured to communicate with the discharge channel, to cause the emissions from the first battery cell and/or the second battery cell to enter the corresponding discharge channel through the second through hole when the first pressure relief mechanism and/or the second pressure relief mechanism is actuated. In this way, the emissions discharged from the first battery cell and/or the second battery cell can rapidly and smoothly enter a degassing channel through the second through hole, thereby improving safety of the battery.

In some implementations, the second through hole communicates with the discharge channel through the first through hole. In this way, the emissions discharged from the first battery cell and/or the second battery cell can rapidly and smoothly enter the first through hole through the second through hole, and then enter a degassing channel, thereby improving safety of the battery.

A second aspect of the embodiments of this application provides an apparatus, including the foregoing battery, where the battery is configured to supply electric energy.

The apparatus provided in this application provides electric energy by using the foregoing battery. The area of the first pressure relief mechanism is limited to be greater than the area of the second pressure relief mechanism, so that the first battery cell with more violent failure reaction can release pressure effectively and timely by using the first pressure relief mechanism with a larger area, so as to effectively relieve a sharp rise in temperature of the first battery cell and effectively reduce a probability of chain reaction triggered by thermal failure of the first battery cell, thereby improving overall safety of the battery.

A third aspect of the embodiments of this application provides a preparation method of battery, including the following steps:

configuring a first battery cell, where the first battery cell includes a first pressure relief mechanism, and the first pressure relief mechanism is configured to be actuated when internal pressure or temperature of the first battery cell reaches a threshold, to release the internal pressure of the first battery cell; and configuring a second battery cell, where the second battery cell includes a second pressure relief mechanism, and the second pressure relief mechanism is configured to be actuated when internal pressure or temperature of the second battery cell reaches a threshold, to release the internal pressure of the second battery cell; where an energy density of the first battery cell is greater than an energy density of the second battery cell, and an area of the first pressure relief mechanism is greater than an area of the second pressure relief mechanism.

In the preparation method of battery provided in the embodiments of this application, the first battery cell with higher energy density and the second battery cell with lower energy density are configured, and the area of the first pressure relief mechanism of the configured first battery cell is limited to be greater than the area of the second pressure relief mechanism of the second battery cell. When thermal failure occurs in the first battery cell and the second battery cell, even if thermal failure reaction of the first battery cell is more violent than thermal failure reaction of the second battery cell, the first battery cell with more violent failure reaction can release pressure effectively and timely by using the first pressure relief mechanism with a larger area, and the second battery cell can release pressure effectively and timely by using the second pressure relief mechanism, so as to effectively relieve a sharp rise in temperature of the first battery cell and effectively reduce a probability of chain reaction triggered by thermal failure of the first battery cell, thereby improving overall safety of the battery.

A fourth aspect of the embodiments of this application provides a preparation apparatus of battery, including:

a first battery cell configuration module, configured to configure a first battery cell, where the first battery cell includes a first pressure relief mechanism, and the first pressure relief mechanism is configured to be actuated when internal pressure or temperature of the first battery cell reaches a threshold, to release the internal pressure of the first battery cell; and a second battery cell configuration module, configured to configure a second battery cell, where the second battery cell includes a second pressure relief mechanism, and the second pressure relief mechanism is configured to be actuated when internal pressure or temperature of the second battery cell reaches a threshold, to release the internal pressure of the second battery cell; where an energy density of the first battery cell is greater than an energy density of the second battery cell, and an area of the first pressure relief mechanism is greater than an area of the second pressure relief mechanism.

In the preparation apparatus of battery provided in the embodiments of this application, the first battery cell with higher energy density is configured by the first battery cell configuration module, the second battery cell with lower energy density is configured by the second battery cell configuration module, and the area of the first pressure relief mechanism of the configured first battery cell is limited to be greater than the area of the second pressure relief mechanism of the second battery cell. When thermal failure occurs in the first battery cell and the second battery cell, even if thermal failure reaction of the first battery cell is more violent than thermal failure reaction of the second battery cell, the first battery cell with more violent failure reaction can release pressure effectively and timely by using the first pressure relief mechanism with a larger area, and the second battery cell can release pressure effectively and timely by using the second pressure relief mechanism, so as to effectively relieve a sharp rise in temperature of the first battery cell and effectively reduce a probability of chain reaction triggered by thermal failure of the first battery cell, thereby improving overall safety of the battery.

REFERENCE SIGNS

Figure 1:
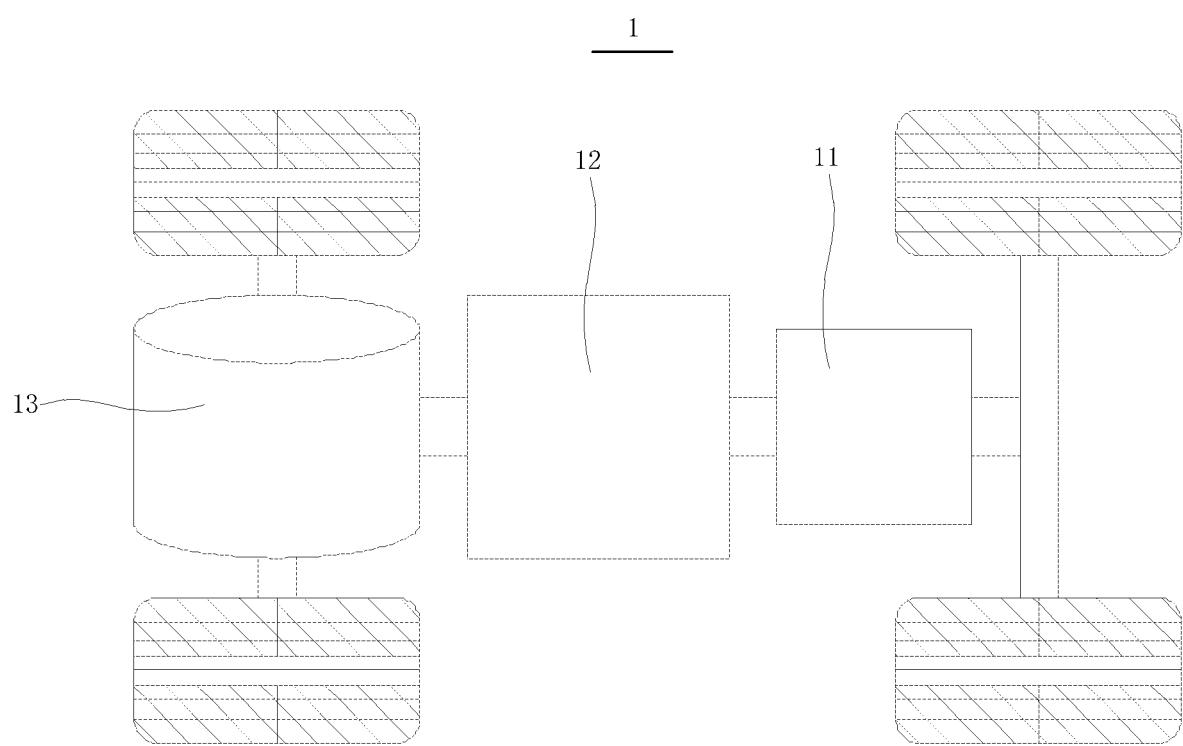
FIG. 1 is a schematic structural diagram of a vehicle according to this application.

1. Vehicle;
  11. Battery;
   111. First battery cell;
    1111. First pressure relief mechanism;
    1112. Positive electrode terminal;
    1113. Negative electrode terminal;
    1114. Housing;
   112. Second battery cell;
    1121. Second pressure relief mechanism;
   113. Box body;
    1131. Bottom wall;
    1132. Side wall;
    1133. First through hole;
   114. First heat insulating member;
   115. Second heat insulating member;
   116. Third heat insulating member;
   117. Discharge channel;
   118. Thermal management part;
    1181. Second through hole;
  12. Controller; and
  13. Motor.

DESCRIPTION OF EMBODIMENTS

A battery is an apparatus for converting chemical energy into electric energy, and is widely applied to fields of new energy vehicles, energy storage power stations, and the like.

An existing type of battery includes a box body and a plurality of battery cells disposed in the box body, where the plurality of battery cells are connected in series and/or in parallel. The plurality of battery cells include a first battery cell and a second battery cell. An energy density of the first battery cell is greater than an energy density of the second battery cell. A first pressure relief mechanism is disposed on the first battery cell, and the first pressure relief mechanism is configured to release gases inside the first battery cell, thereby ensuring safety of the first battery cell. A second pressure relief mechanism is disposed on the second battery cell, and the second pressure relief mechanism is configured to release gases inside the second battery cell, thereby ensuring safety of the second battery cell.

However, the inventors of this application finds through research that, when thermal failure occurs, failure reaction of the first battery cell is more violent than failure reaction of the second battery cell, that is, high temperature gas generated in the first battery cell is far more than high temperature gas generated in the second battery cell, and therefore temperature of the first battery cell is more likely to rise, that easily triggers chain reaction, further aggravating thermal failure of the first battery cell and causing the problem of safety of the battery.

To resolve the problem of chain reaction caused by the first battery cell with violent failure reaction, which in turn triggers safety of the battery, this application provides a battery, an apparatus, a preparation method of battery, and a preparation apparatus of battery. A first pressure relief mechanism is disposed on a first battery cell, a second pressure relief mechanism is disposed on a second battery cell, and an area of the first pressure relief mechanism is limited to be greater than an area of the second pressure relief mechanism. In this way, when the internal pressure or temperature of the first battery cell reaches a threshold, the first battery cell with higher energy density can release pressure timely by using the first pressure relief mechanism with a larger area, thereby effectively relieving the rapid rise in temperature of the first battery cell, effectively reducing chain reaction triggered by thermal failure of the first battery cell, and improving the safety of the battery.

The following clearly describes the technical solutions in the embodiments of this application with reference to the accompanying drawings in the embodiments of this application, so that the foregoing objectives, features and advantages of the embodiments of this application can be clearer. Apparently, the described embodiments are merely some but not all of the embodiments of this application. All other embodiments obtained by a person of ordinary skill in the art based on the embodiments of this application without creative efforts shall fall within the protection scope of this application.

The embodiments of this application provide an apparatus and a battery. The apparatus provided in this application includes the battery, where the battery is configured to supply electric energy. The apparatus provided in this application is, for example, a mobile phone, a portable device, a laptop, an electric scooter, an electric vehicle, a steamship, a spacecraft, an electric toy, or an electric tool. The spacecraft is, for example, an airplane, a rocket, a space shuttle, or a spaceship. The electric toy includes, for example, a fixed or mobile electric toy, such as a game console, an electric vehicle toy, an electric ship toy, and an electric airplane toy. The electric tool includes, for example, an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

The battery described in this application is not limited to be applied to the electric apparatuses described above. However, for ease of description, the following embodiments are all described by using an electric vehicle as an example.

FIG. 1 is a simple schematic diagram of a vehicle 1 according to an embodiment. The vehicle 1 may be an oil-fueled vehicle, a gas-powered vehicle, or a new energy vehicle. The new energy vehicle may be a battery electric vehicle, a hybrid electric vehicle, an extended-range electric vehicle, or the like. A battery 11 may be disposed in the vehicle 1. In a specific example, the battery 11 may be disposed at a bottom, head, or tail of the vehicle 1. The battery 11 may be configured to supply power to the vehicle 1. For example, the battery may be used as an operational power supply for the vehicle 1. The vehicle 1 may further include a controller 12 and a motor 13. The controller 12, for example, is configured to control the battery 11 to supply power to the motor 13. The battery 11 may be configured to start and navigate the vehicle 1, and so on. Certainly, the battery 11 may further be configured to drive the vehicle 1, and replace or partly replace fuel oil or natural gas to supply driving power to the vehicle 1.

Figure 2:
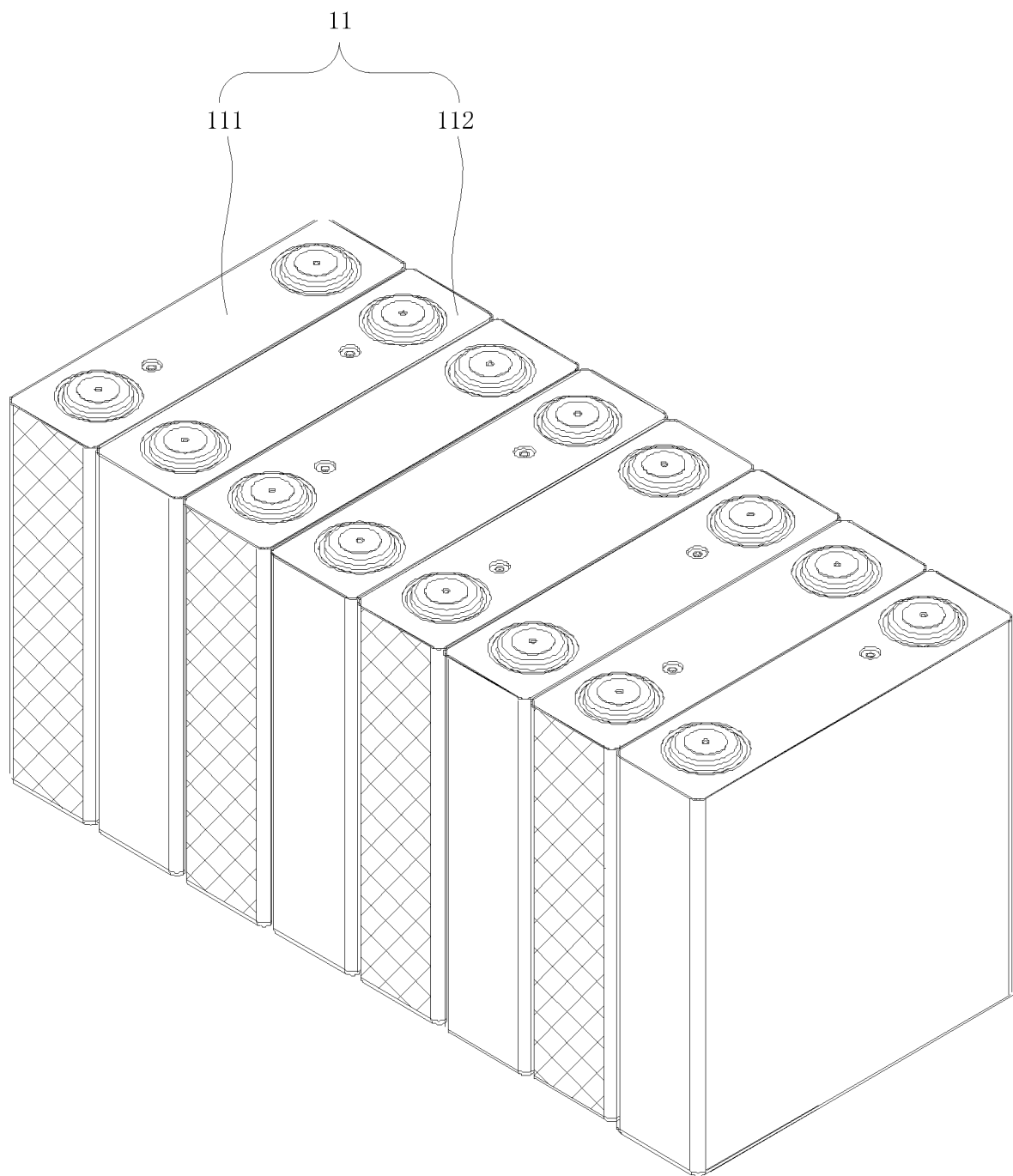
FIG. 2 is a schematic structural diagram of a battery module according to an embodiment of this application.
Figure 3:
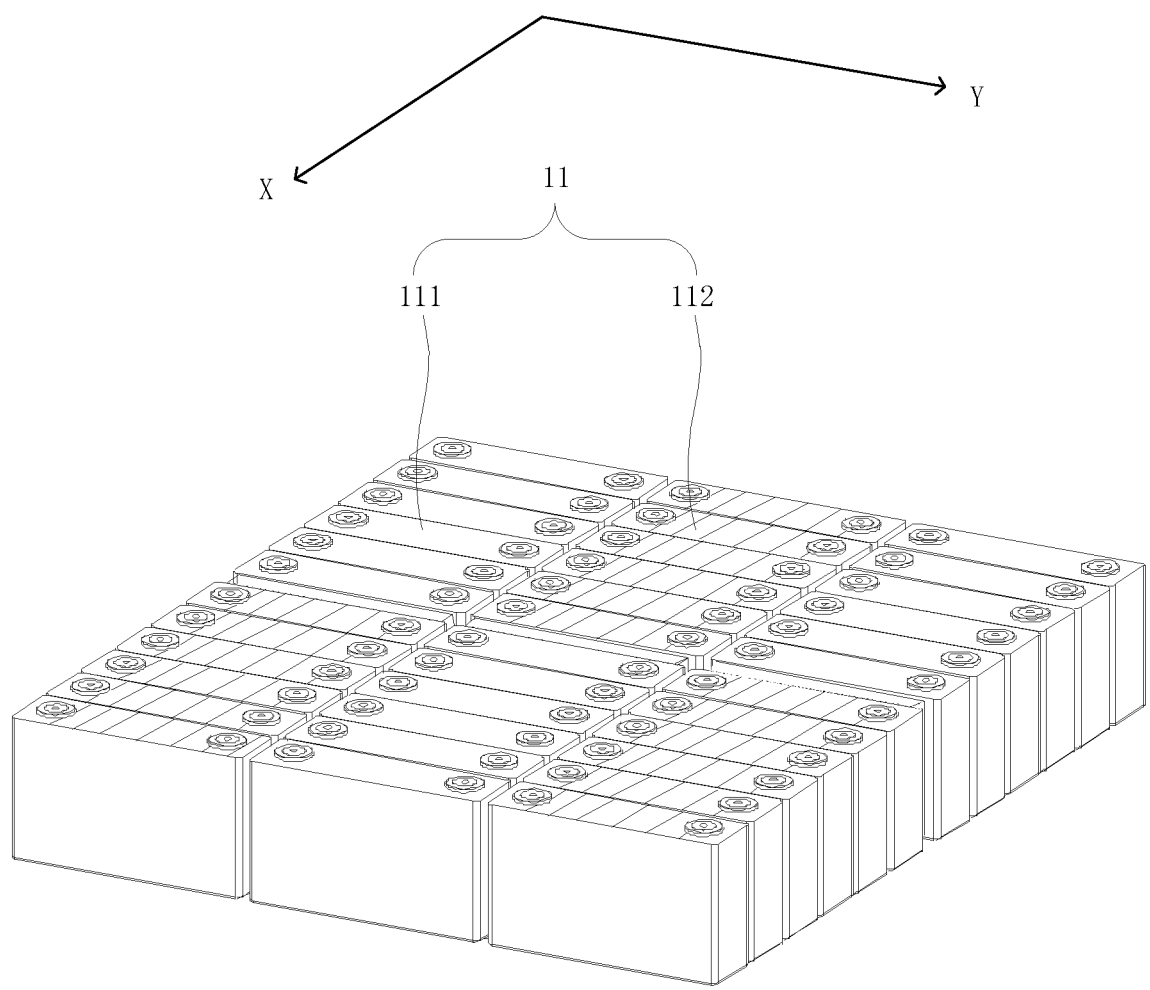
FIG. 3 is a schematic structural diagram of a battery pack according to an embodiment of this application.

The battery 11 mentioned in this embodiment may be a battery module shown in FIG. 2, a battery pack shown in FIG. 3, or the like. Basic structural units of the battery module and the battery pack are battery cells. A plurality of battery cells are connected in series and/or in parallel by using electrode terminals, for use in various electric apparatuses. The battery module protects the battery cells against external impact, heat, vibration, and the like. A specific quantity of battery cells are electrically connected together and placed into a frame to form the battery module. The battery pack is a final state of a battery system assembled in an electric vehicle. Most existing battery packs are made by assembling various control and protection systems such as a battery management system and a thermal management part on one or more battery modules. With the development of technologies, the battery module may be omitted. To be specific, the battery pack is directly formed by using battery cells. With this improvement, weight energy density and volumetric energy density of the battery system are improved, and the number of parts is remarkably reduced.

As shown in FIG. 2 to FIG. 6, the battery 11 of this application includes a first battery cell 111 and a second battery cell 112, and an energy density of the first battery cell 111 is greater than an energy density of the second battery cell 112. The first battery cell 111 includes a first pressure relief mechanism 1111, where the first pressure relief mechanism 1111 is configured to be actuated when internal pressure or temperature of the first battery cell 111 reaches a threshold, to release the internal pressure of the first battery cell 111. The second battery cell 112 includes a second pressure relief mechanism 1121, where the second pressure relief mechanism 1121 is configured to be actuated when internal pressure or temperature of the second battery cell 112 reaches a threshold, to release the internal pressure of the second battery cell 112. An area of the first pressure relief mechanism 1111 is greater than an area of the second pressure relief mechanism 1121.

The first pressure relief mechanism 1111 is a component or part that can be actuated when the internal pressure or internal temperature of the first battery cell 111 reaches a preset threshold, to release the internal pressure and/or internal substances. The first pressure relief mechanism 1111 may specifically take a form of an explosion-proof valve, a gas valve, a pressure relief valve, a safety valve, or the like, and may specifically use a pressure sensitive or temperature sensitive component or structure. To be specific, when the internal pressure or temperature of the first battery cell 111 reaches a preset threshold, the first pressure relief mechanism 1111 performs actions or a weak structure in the first pressure relief mechanism 1111 is broken, so as to form an opening or channel for releasing the internal pressure.

It can be understood that the second pressure relief mechanism 1121 is a component or part that can be actuated when internal pressure or internal temperature of the second battery cell 112 reaches a preset threshold, to release the internal pressure and/or internal substances. The second pressure relief mechanism 1121 may specifically take a form of an explosion-proof valve, a gas valve, a pressure relief valve, a safety valve, or the like, and may specifically be a pressure sensitive or temperature sensitive component or structure. To be specific, when the internal pressure or temperature of the second battery cell 112 reaches a preset threshold, the second pressure relief mechanism 1121 performs an action or a weak structure in the second pressure relief mechanism 1121 is broken, so as to form an opening or channel for releasing the internal pressure.

The threshold in this application may be a pressure threshold or a temperature threshold. Design of the threshold varies depending on different design requirements. For example, the threshold may be designed or determined based on an internal pressure or internal temperature value of the first battery cell 111 that is considered as being dangerous or at risk of being out of control. In addition, the threshold may, for example, depend on materials used for one or more of a positive electrode plate, a negative electrode plate, an electrolyte, and a separator in the first battery cell 111. For another example, the threshold may be designed or determined based on an internal pressure or internal temperature value of the second battery cell 112 that is considered as being dangerous or at risk of being out of control. In addition, the threshold may, for example, depend on materials used for one or more of a positive electrode plate, a negative electrode plate, an electrolyte, and a separator in the second battery cell 112.

The term "actuate" mentioned in this application means that the first pressure relief mechanism 1111 performs an action or is activated to a specific state, so that internal pressure of the first battery cell 111 can be released, and that the second pressure relief mechanism 1121 performs actions or is activated to a given state, so that internal pressure of the second battery cell 112 can be released. The action performed by the first pressure relief mechanism 1111 may include but is not limited to, for example, cracking, breaking, tearing, or opening at least part of the first pressure relief mechanism 1111. When the first pressure relief mechanism 1111 is actuated, high-temperature and high-pressure substances in the first battery cell 111 are discharged from the actuated part as emissions. In this way, the first battery cell 111 can release pressure under a condition of controllable pressure or temperature, thereby avoiding more serious potential accidents. The emissions from the first battery cell 111 mentioned in this application include but are not limited to: electrolytes, fragments of positive and negative electrode plates and separator because of dissolution or breaking, high-temperature and high-pressure gas and flames generated by reactions, and the like. The high-temperature and high-pressure emissions are discharged towards a side of the first battery cell 111 on which the first pressure relief mechanism 1111 is provided, and may be more specifically discharged towards a region in which the first pressure relief mechanism 1111 is actuated. The strength and destructive power of the emissions are probably large, even large enough to break one or more parts in that direction. Likewise, the action performed by the second pressure relief mechanism 1121 may include but is not limited to, for example, cracking, breaking, tearing, or opening at least part of the second pressure relief mechanism 1121. When the second pressure relief mechanism 1121 is actuated, high-temperature and high-pressure substances in the second battery cell 112 are discharged from an actuated part as emissions. In this way, the second battery cell 112 can release pressure under a condition of controllable pressure or temperature, thereby avoiding more serious potential accidents. The emissions from the second battery cell 112 mentioned in this application include but are not limited to: electrolytes, fragments of positive and negative electrode plates and separator because of dissolution or breaking, high-temperature and high-pressure gas and flames generated by reactions, and the like. The high-temperature and high-pressure emissions are discharged towards a side of the second battery cell 112 on which the second pressure relief mechanism 1121 is provided, and may be more specifically discharged towards a region in which the second pressure relief mechanism 1121 is actuated. The strength and destructive power of the emissions are probably large, even large enough to break one or more parts in that direction.

The first battery cell 111 and the second battery cell 112 in this application may be lithium-ion secondary batteries, lithium-ion primary batteries, lithium-sulfur batteries, sodium-lithium-ion batteries, sodium-ion batteries, magnesium-ion batteries, or the like. This is not limited in the embodiments of this application. The first battery cell 111 and the second battery cell 112 may be in a cylindrical shape, a flat shape, a cuboid shape, or other shapes. This is not limited in the embodiments of this application either. In terms of packaging method, the first battery cell 111 and the second battery cell 112 are typically classified into three types: cylindrical battery cells, square battery cells, and soft pack battery cells. This is not limited in the embodiments of this application.

As shown in FIG. 7 to FIG. 10, the first battery cell 111 typically includes an electrode assembly (not shown) and an electrolyte (not shown), where the electrode assembly includes a positive electrode plate, a negative electrode plate, and a separator disposed between the positive electrode plate and the negative electrode plate. Operation of the first battery cell 111 mainly depends on migration of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer bulges out of a current collector coated with the positive electrode active substance layer, and the current collector uncoated with the positive electrode active substance layer is used as a positive tab. Using the lithium-ion battery as an example, a material of the positive electrode current collector may be aluminum, and a positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A current collector uncoated with the negative electrode active substance layer bulges out of a current collector coated with the negative electrode active substance layer, and the current collector uncoated with the negative electrode active substance layer is used as a negative tab. A material of the negative electrode current collector may be copper, and a negative electrode active substance may be carbon, silicon, or the like. To ensure that no fuse blows as a large current passes through, a plurality of positive tabs are stacked together, and a plurality of negative tabs are stacked together. A material of the separator may be polypropylene (PP), polyethylene (PE), or the like. In addition, the electrode assembly may be of a wound structure or a laminated structure. There may be one or more electrode assemblies. This is not specifically limited in the embodiments of this application. The first battery cell 111 further includes a housing 1114, where the electrode assembly and the electrolyte are both sealed in the housing 1114, the housing 1114 may be a hollow cuboid, cube, or cylinder, a material of the housing 1114 may be aluminum or steel and alloys thereof, or may be plastic material or aluminum-plastic film. A positive electrode terminal 1112 and a negative electrode terminal 1113 are further provided on the housing 1114, the positive tab is electrically connected to the positive electrode terminal 1112, and the negative tab is electrically connected to the negative electrode terminal 1113, so as to output electric energy. The first pressure relief mechanism 1111 is further provided on the housing 1114. The first pressure relief mechanism 1111 may be disposed in any position of the housing 1114. For example, the first pressure relief mechanism 1111 may be disposed on the top, the bottom, or a side of the housing 1114, or the first pressure relief mechanism 1111 may be disposed between the positive electrode terminal 1112 and the negative electrode terminal 1113. This is not specifically limited in this application, provided that the internal pressure of the first battery cell 111 can be released.

It may be understood that the second battery cells 112 and the first battery cells 111 are the same in structure. This is not described herein again.

In some implementations, a ratio of the energy density $E_1$ of the first battery cell 111 to the energy density $E_2$ of the second battery cell 112 satisfies: $1.26 \leq E_1/E_2 \leq 2.14$. The energy density refers to the amount of energy released by a battery per unit mass or unit volume, namely gravimetric energy density or volumetric energy density. In some implementations, the first battery cell 111 is, for example, a ternary lithium battery, such as a lithium nickel cobalt manganate battery or a lithium nickel cobalt aluminate battery. The second battery cell 112 is, for example, a lithium iron phosphate battery or a lithium cobalt oxide battery. It should be noted that the energy density of the first battery cell 111 is greater than the energy density of the second battery cell 112, and thermal failure reaction of the first battery cell 1115 is usually more violent than failure reaction of the second battery cell 112. The first battery cell 111 and the second battery cell 112 are arranged simultaneously, helping reduce chain reaction of thermal failure and relieve thermal diffusion, and further improving safety of the battery 11.

In some implementations, a ratio of the area $A_1$ of the first pressure relief mechanism 1111 to the area $A_2$ of the second pressure relief mechanism 1121 satisfies: $1.5 \leq A_1/A_2 \leq 4$, so that the first battery cell 111 and the second battery cell 112 both can release energy effectively and timely, thereby improving safety of the battery.

In the battery 11 provided in this embodiment of this application, the first pressure relief mechanism 1111 is disposed on the first battery cell 111, so that when the internal pressure or temperature of the first battery cell 111 reaches a threshold, the first battery cell 111 can release the internal pressure; and the second pressure relief mechanism 1121 is disposed on the second battery cell 112, so that when the internal pressure or temperature of the second battery cell 112 reaches a threshold, the second battery cell 112 can also release the internal pressure. The energy density of the first battery cell 111 is greater than the energy density of the second battery cell 112, and the thermal failure reaction of the first battery cell 111 is more violent than the thermal failure reaction of the second battery cell 112. The area of the first pressure relief mechanism 1111 is limited to be greater than the area of the second pressure relief mechanism 1121, so that the first battery cell 111 with more violent failure reaction can release pressure effectively and timely by using the first pressure relief mechanism 1111 with a larger area, so as to effectively reduce the probability that the first battery cell 111 causes chain reaction due to failure to release the internal pressure timely, thereby improving overall safety of the battery 11.

In the battery 11 in this embodiment, the first battery cell 111 and the second battery cell 112 are arranged alternately with n first battery cells 111 followed by m second battery cells 112, where $n \geq 1$, $m \geq 1$, and n and m are both integers.

Figure 4:
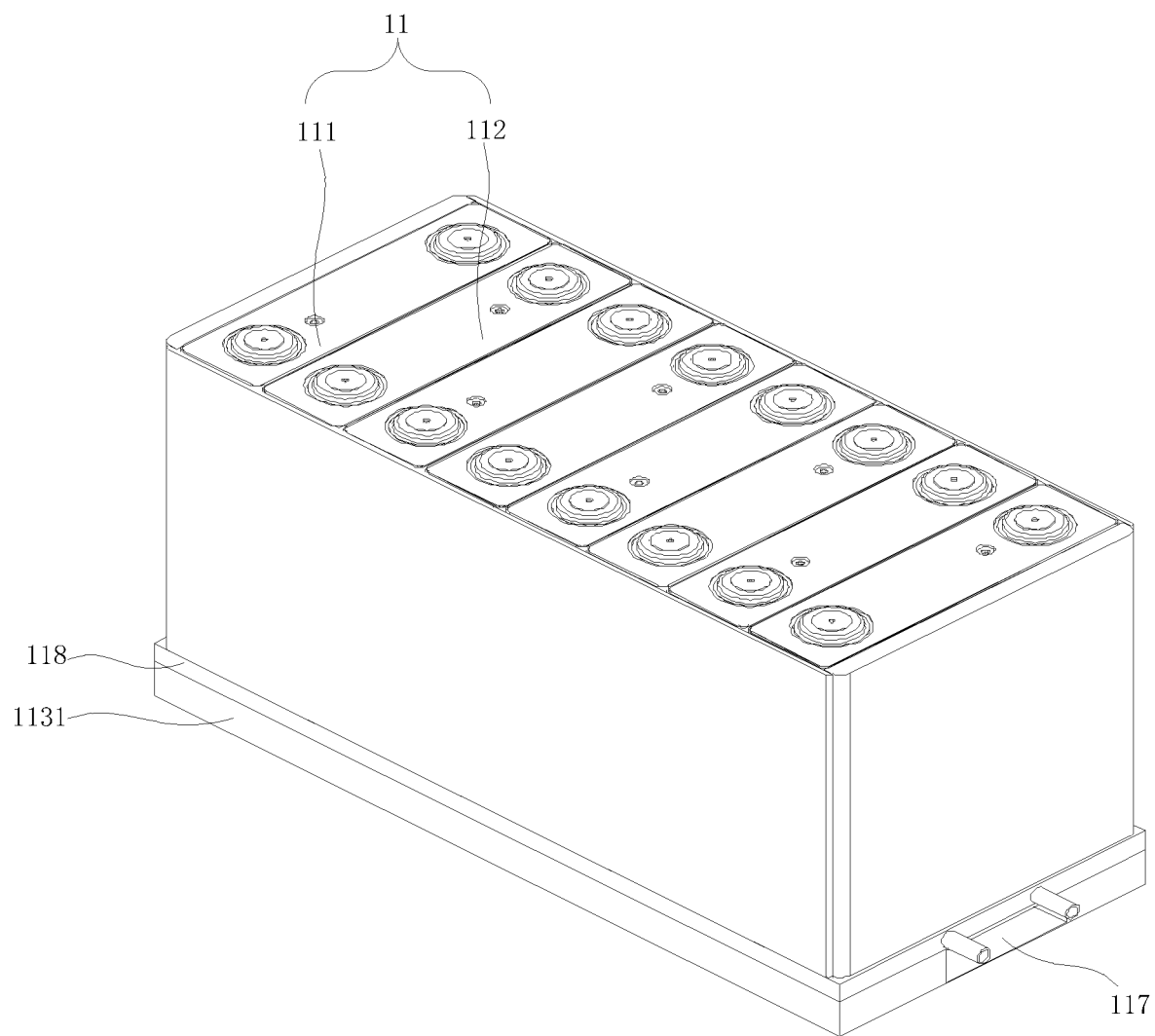
FIG. 4 is a first schematic structural diagram of a battery according to an embodiment of this application.
Figure 5:
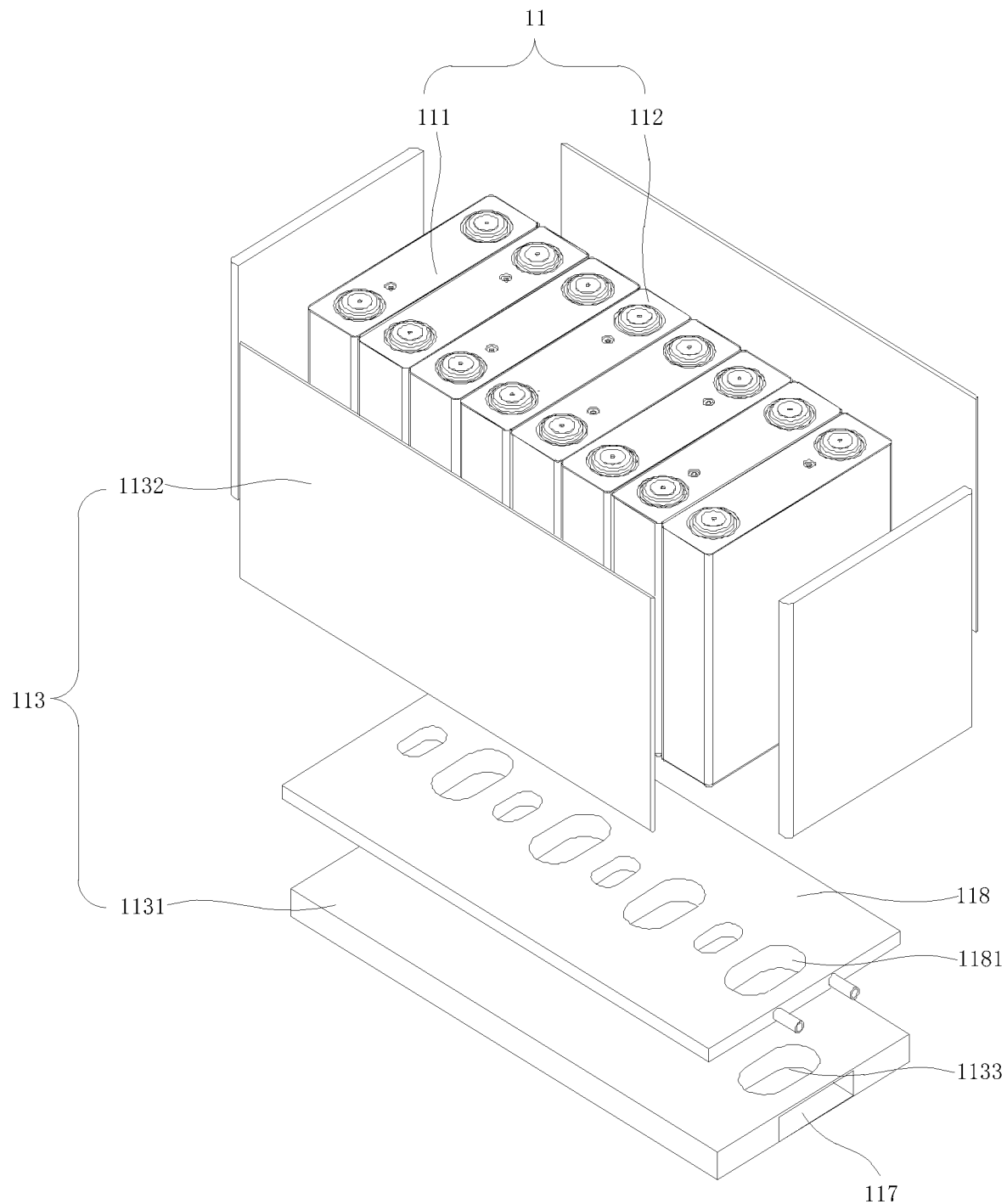
FIG. 5 is a first exploded view of a battery according to an embodiment of this application.
Figure 6:
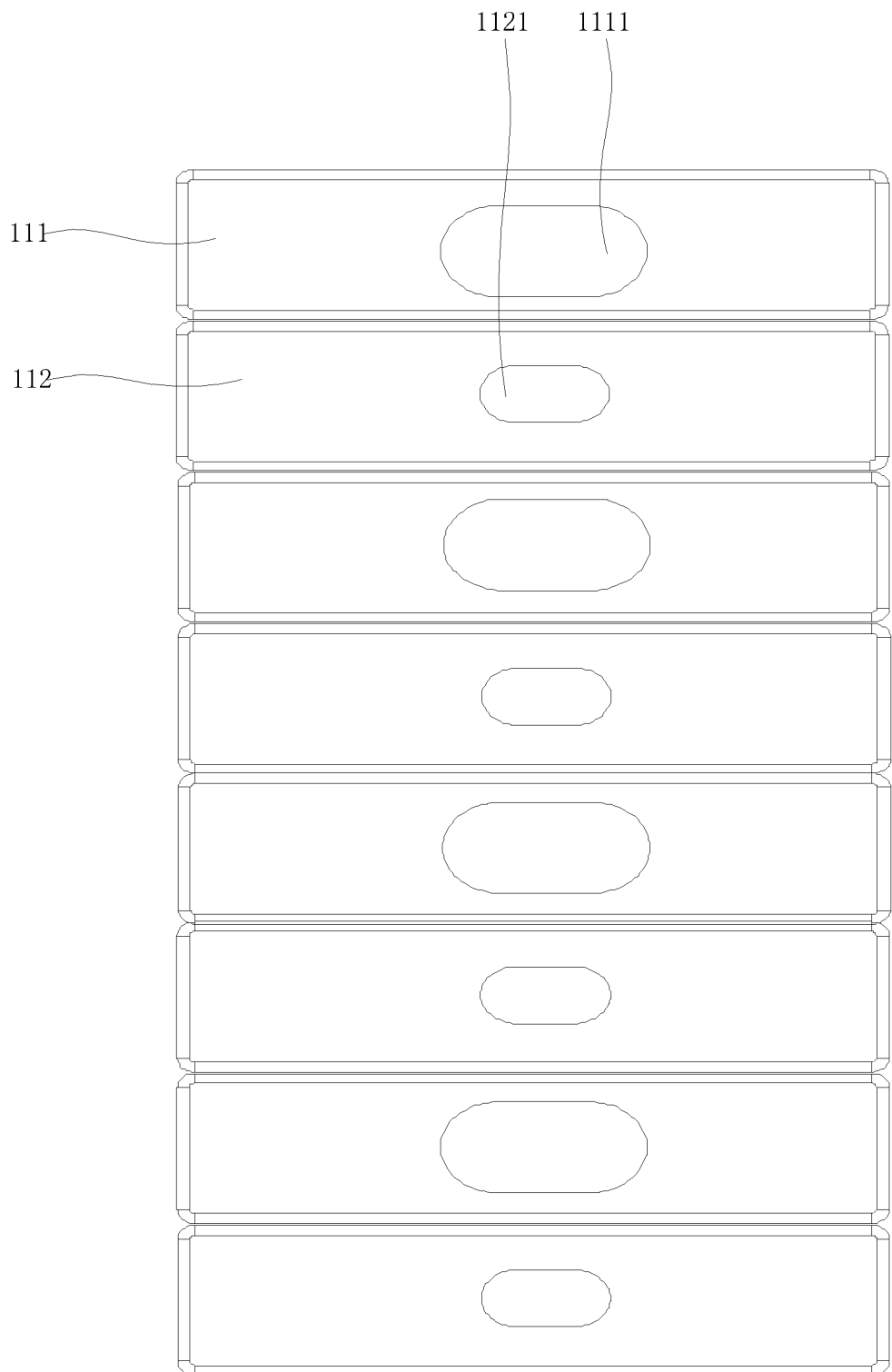
FIG. 6 is a second schematic structural diagram of a battery according to an embodiment of this application.
Figure 7:
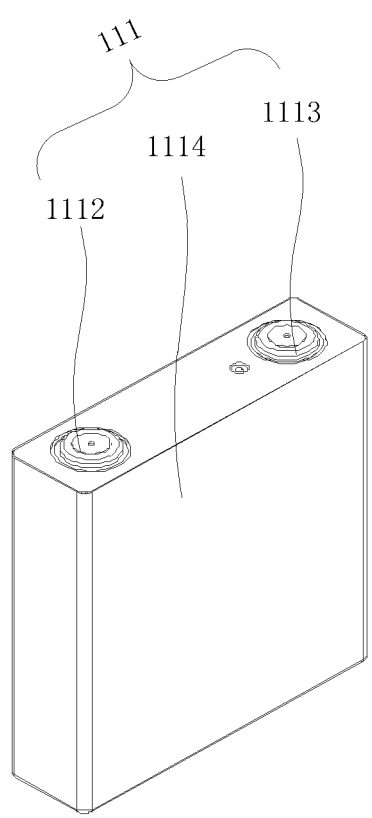
FIG. 7 is a schematic structural diagram of a battery cell according to an embodiment of this application.
Figure 8:
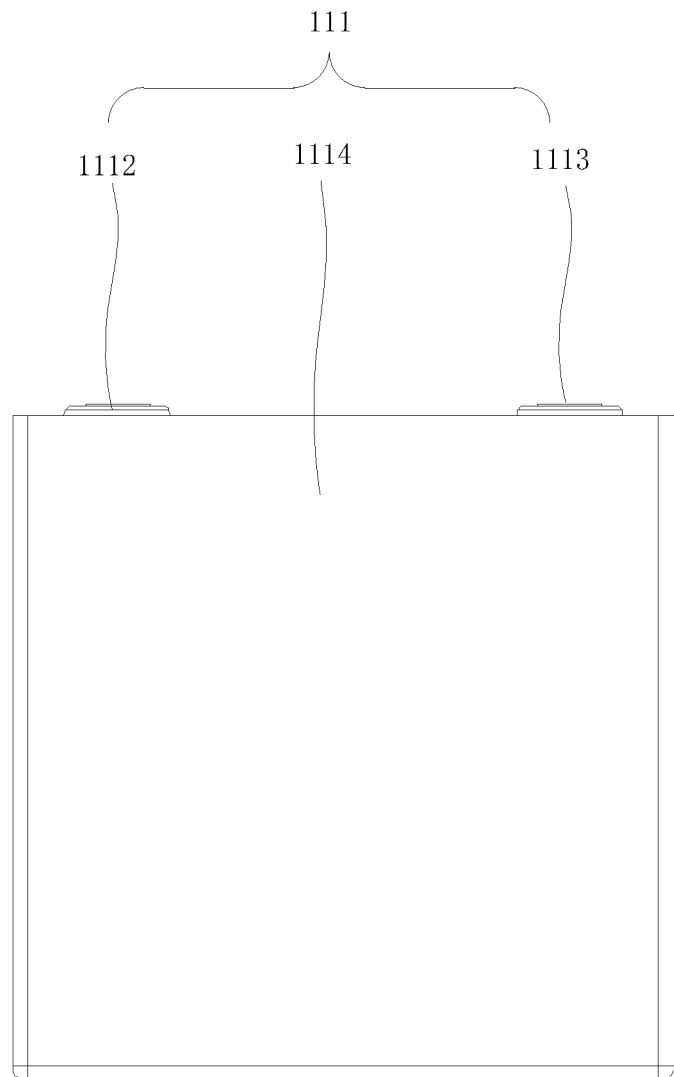
FIG. 8 is a front view of a battery cell according to an embodiment of this application.
Figure 9:
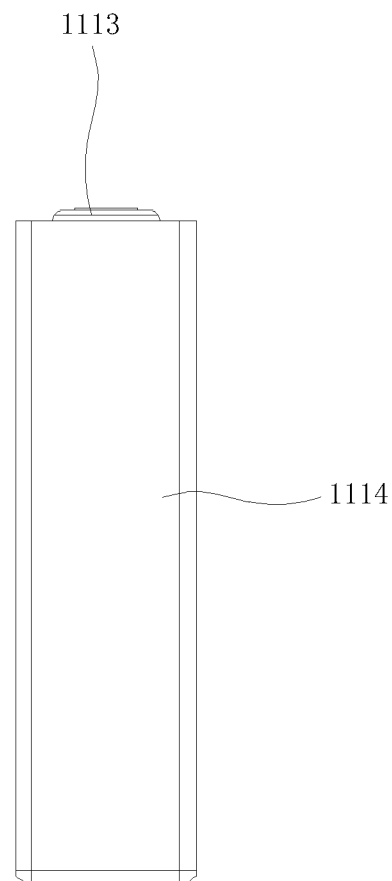
FIG. 9 is a right view of a battery cell according to an embodiment of this application.
Figure 10:
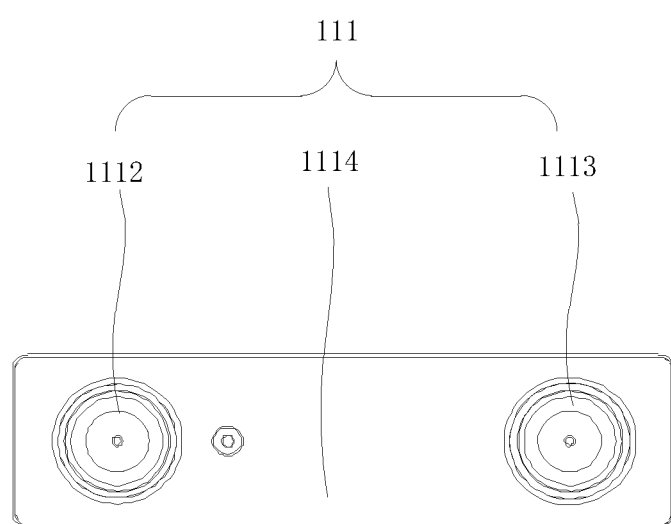
FIG. 10 is a vertical view of a battery cell according to an embodiment of this application.
Figure 11:
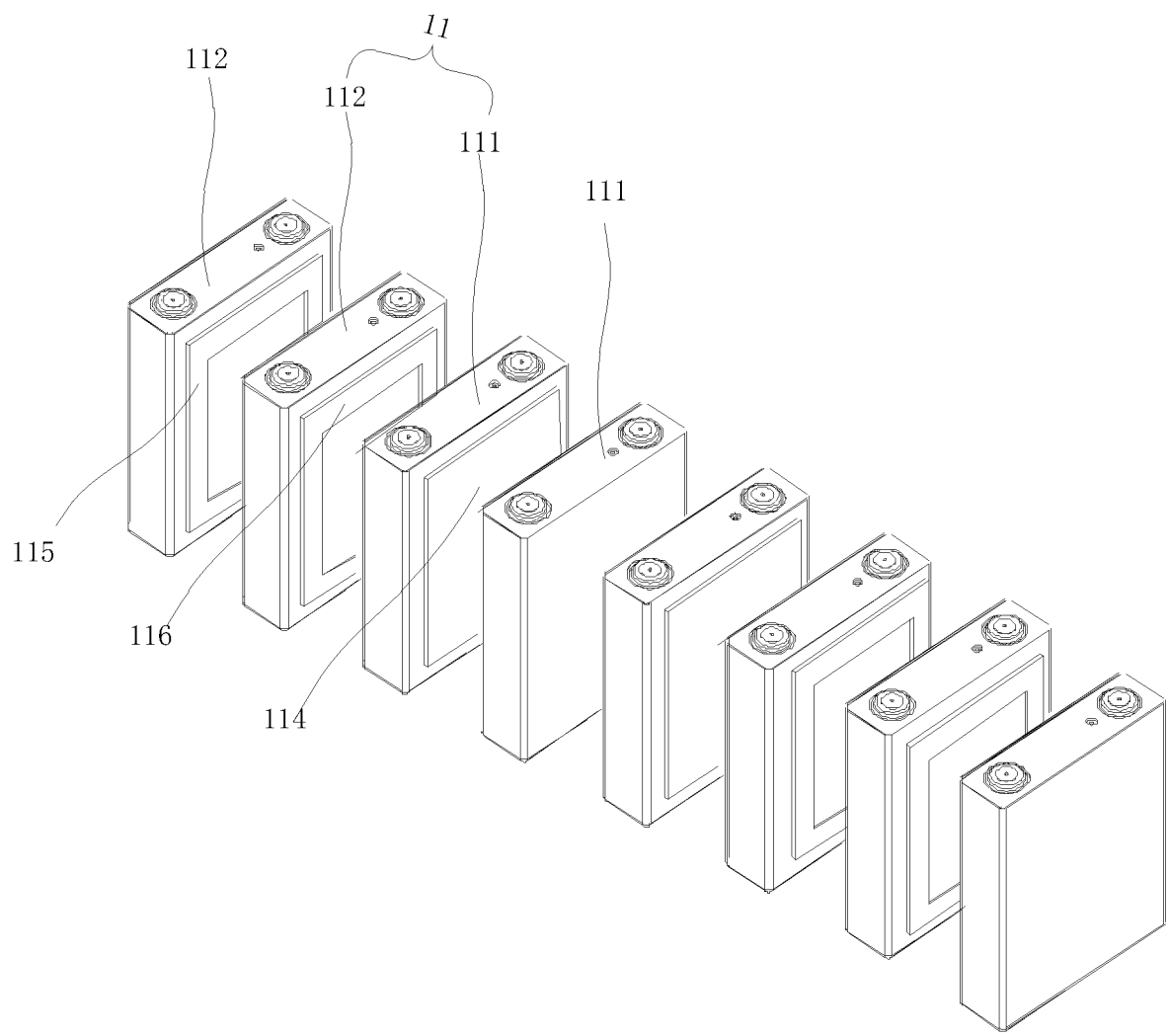
FIG. 11 is a second exploded view of a battery according to an embodiment of this application.

Values of n and m may be the same, or may be different. For example, in some implementations, as shown in FIG. 2, FIG. 4, and FIG. 5, values of n and m are both 1, that is, n=1 and m=1. In this case, the first battery cells 111 and the second battery cells 112 are arranged alternately in a row or a column. To be specific, one second battery cell 112 is disposed between two adjacent ones of the first battery cells 111, and one first battery cell 111 is disposed between two adjacent ones of the second battery cells 112. For another example, in some implementations, as shown in FIG. 3, values of n and m are both 6, that is, n=6 and m=6. In this case, six first battery cells 111 and six second battery cells 112 form three arrangement units. The three arrangement units are arranged in a direction Y shown in FIG. 3, the six first battery cells 111 and the six second battery cells 112 in each arrangement unit are arranged in a direction X shown in FIG. 3, and in two adjacent ones of the arrangement units, the first battery units 111 is staggered with the second battery cells 112. For another example, in some other implementations, as shown in FIG. 11, a value of n is 2, and a value of m is 2, that is, n=2 and m=2. In this case, the first battery cells 111 and the second battery cells 112 are arranged in a row or a column, with every two pairs of first battery cells 111 spaced by one pair of second battery cells 112, that is, arrangement units, each including two first battery cells 111 and two second battery cells 112, are cyclically arranged in a row or a column. It can be understood that values of n and m may alternatively be other values. This is not enumerated herein.

As shown in FIG. 11, in the battery 11 of this application, in some implementations, a first heat insulating member 114 is further provided between two adjacent ones of the first battery cells 111, and when thermal failure occurs in one of the first battery cells 111, thermal failure can be effectively prevented, by using the first heat insulating member 114, in a first battery cell 111 adjacent to the first battery cell 111 in which thermal failure occurs. In some implementations, a second heat insulating member 115 is further provided between two adjacent ones of the second battery cells 112, and when thermal failure occurs in one of the second battery cells 112, thermal failure can be effectively prevented, by using the second heat insulating member 115, in a second battery cell 112 adjacent to the first battery cell 112 in which thermal failure occurs. In some implementations, a third heat insulating member 116 is further provided between adjacent first battery cell 111 and second battery cell 112, and when thermal failure occurs in one first battery cell 111, thermal failure can be effectively prevented, by using the third heat insulating member 116, in a second battery cell 112 adjacent to the first battery cell 111 in which thermal failure occurs, and vice versa. In some implementations, the battery 11 includes at least one of the first heat insulating member 114, the second heat insulating member 115, and the third heat insulating member 116. In some implementations, the first heat insulating member 114, the second heat insulating member 115, and the third heat insulating member 116 may be at least one of foam, rubber, heat-insulating wool, or aerogel heat-insulating pad. In some implementations, the first heat insulating member 114, the second heat insulating member 115, and the third heat insulating member 116 may be configured as a structure in a square frame. Further, the first heat insulating member 114, the second heat insulating member 115, and the third heat insulating member 116 further include a filling member, configured to fill a hollow part in the square frame. The filling member is elastic, and the filling member is selected from at least one of foam, rubber, heat-insulating wool, or aerogel heat-insulating pad.

The battery 11 in this embodiment of this application further includes a discharge channel 117, where the discharge channel 117 is disposed facing the first pressure relief mechanism 1111 and/or the second pressure relief mechanism 1121, and the discharge channel 117 is configured to collect emissions from the first battery cell 111 when the first pressure relief mechanism 1111 is actuated, and/or collect emissions from the second battery cell 112 when the second pressure relief mechanism 1121 is actuated. The discharge channel is disposed to timely release the internal pressure of the first battery cell 111 and the second battery cell 112 when the internal pressure or temperature of the first battery cell 111 and the second battery cell 112 reaches a threshold, making the battery 11 safer to use.

Figure 13A:
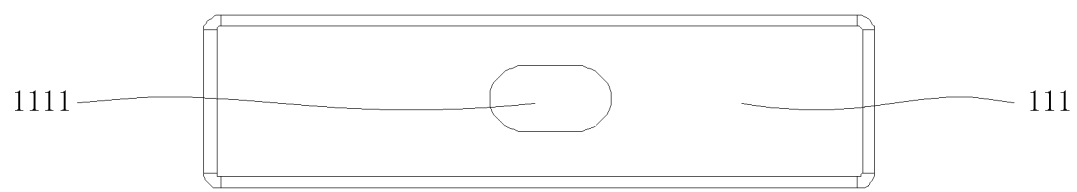
FIG. 13a is a schematic structural diagram of a first battery cell according to an embodiment of this application.

In some implementations, the discharge channel 117 is disposed facing the first pressure relief mechanism 1111, and the discharge channel 117 is configured to collect emissions from the first battery cell 111 when the first pressure relief mechanism 1111 is actuated. In some implementations, the discharge channel 117 is disposed facing the second pressure relief mechanism 1121, and the discharge channel 117 is configured to collect emissions from the second battery cell 112 when the second pressure relief mechanism 1121 is actuated. In some other implementations, as shown in FIG. 4 and FIG. 5, the discharge channel 117 is disposed facing both the first pressure relief mechanism 1111 of the first battery cell 111 and the second pressure relief mechanism 1121 of the second battery cell 112, and the discharge channel 117 is configured to collect emissions from the first battery cell 111 and the second battery cell 112 when the first pressure relief mechanism 1111 and the second pressure relief mechanism 1121 are actuated. Correspondingly, the first pressure relief mechanism 1111 of the first battery cell 111 is arranged right in the middle, as shown in FIG. 13a. Likewise, the second pressure relief mechanism 1121 of the second battery cell 112 is also arranged right in the middle.

Figure 12:
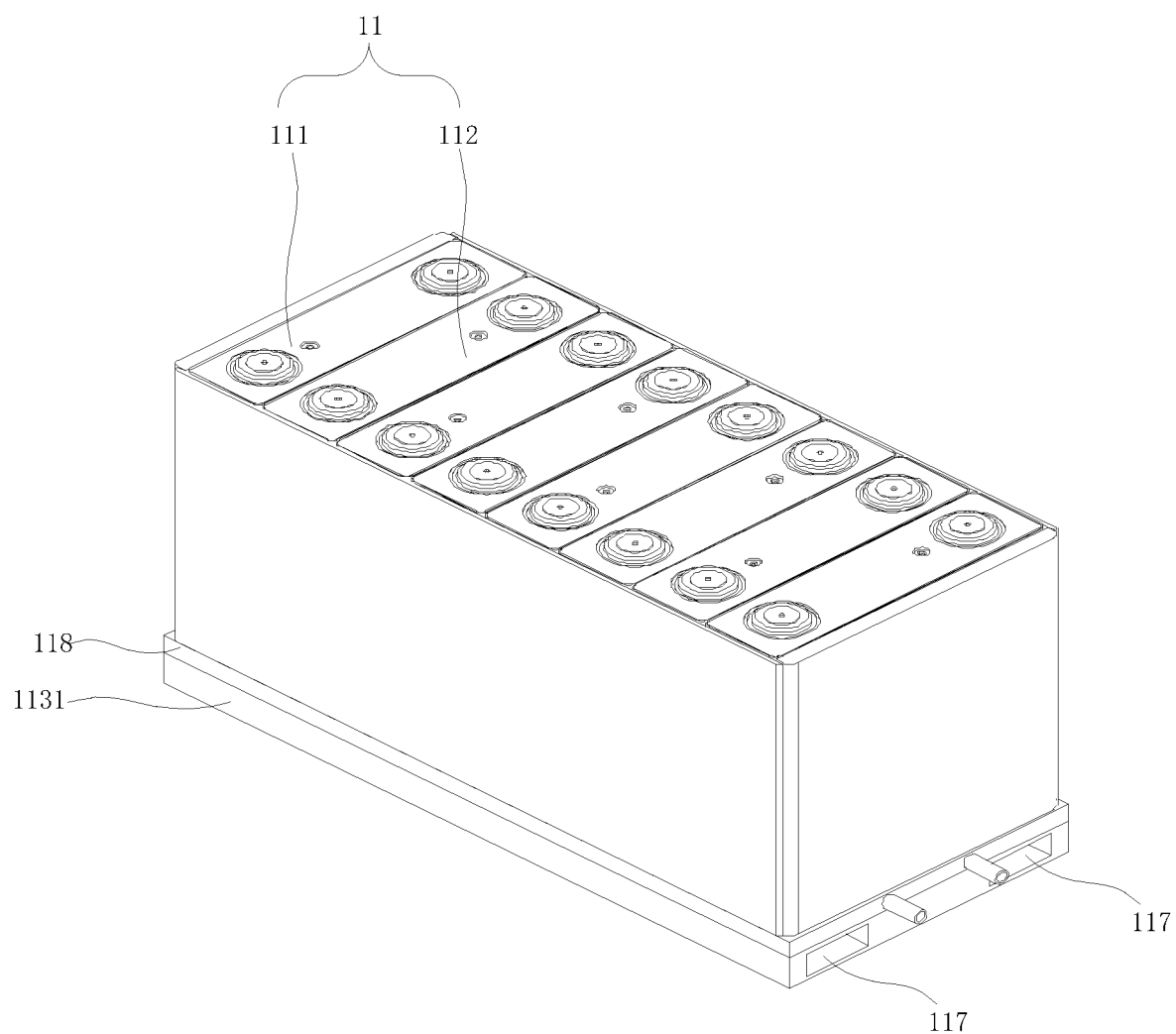
FIG. 12 is a third schematic structural diagram of a battery according to an embodiment of this application.

In an implementation shown in FIG. 12, the discharge channel 117 is provided in a quantity of at least two, the discharge channels 117 are spaced apart, and the first pressure relief mechanism 1111 and the second pressure relief mechanism 1121 are disposed facing the different discharge channels 117 respectively. For example, the first battery cells 111 and the second battery cells 112 are arranged in a column, and the first battery cells 111 and the second battery cells 112 may have substantially the same length and width, and may have the same thickness or different thicknesses. In addition, a distance from the first pressure relief mechanism 1111 on the first battery cell 111 to a side edge of the first battery cell 111 is one fourth of the width of the first battery cell 111, and a distance from the second pressure relief mechanism 1121 on the second battery cell 112 to a side edge of the second battery cell 112 is one fourth of the width of the second battery cell 112. The first pressure relief mechanism 1111 and the second pressure relief mechanism 1121 are not colinear. To be specific, the first pressure relief mechanism 1111 on the first battery cell 111 and the second pressure relief mechanism 1121 on the second battery cell 112 are staggered in an arrangement direction of the first battery cell 111 and the second battery cell 112. In this way, when the internal pressure or temperature of the first battery cell 111 reaches a threshold, emissions in the first battery cell 111 are discharged through one of the discharge channels 117, and when the internal pressure or temperature of the second battery cell 112 reaches a threshold, emissions in the second battery cell 112 are discharged through one of the discharge channels 117, so that the emissions from the first battery cells 111 and the second battery cells 112 can all be discharged out of the battery 11 effectively and timely, thereby improving safety of the battery 11.

Figure 13B:
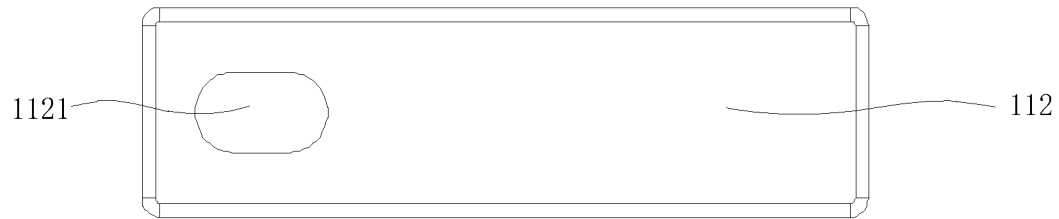
FIG. 13b is a schematic structural diagram of a second battery cell according to an embodiment of this application.

Certainly, in an alternative implementation of the foregoing implementation, as shown in FIG. 13a and FIG. 13b, a distance from the first pressure relief mechanism 1111 on the first battery cell 111 to a side edge of the first battery cell 111 is one half of the width of the first battery cell 111, and a distance from the second pressure relief mechanism 1121 on the second battery cell 112 to a side edge of the second battery cell 112 is one fourth of the width of the second battery cell 112. In this case, the first pressure relief mechanism 1111 on the first battery cell 111 and the second pressure relief mechanism 1121 on the second battery cell 112 are not colinear. To be specific, the first pressure relief mechanism 1111 on the first battery cell 111 and the second pressure relief mechanism 1121 on the second battery cell 112 are staggered in an arrangement direction of the first battery cell 111 and the second battery cell 112.

In some implementations, the first battery cell 111 is provided in a quantity of at least two, and the first pressure relief mechanisms 1111 of two adjacent ones of the first battery cells 111 are disposed facing the different discharge channels 117 respectively. Therefore, the different first battery cells 111 can discharge emissions through the different discharge channels 117 respectively, so that emissions from the first battery cells 111 can be discharged out of the battery 11 effectively and timely. In addition, thermal failure of the second battery cell 112 caused by thermal failure of the first battery cell 111 can be effectively reduced, thereby cutting off chain reaction and improving safety of the battery 11.

In some other implementations, the second battery cell 112 is provided in a quantity of at least two, and the second pressure relief mechanisms 1121 of two adjacent ones of the second battery cells 112 are disposed facing the different discharge channels 117 respectively. Therefore, the different second battery cells 112 can discharge emissions through the different discharge channels 117 respectively, so that the emissions from the second battery cells 112 can be discharged out of the battery 11 effectively and timely. In addition, thermal failure of the first battery cell 111 caused by thermal failure of the second battery cell 112 can be effectively reduced, thereby cutting off chain reaction and improving safety of the battery 11.

Figure 14:
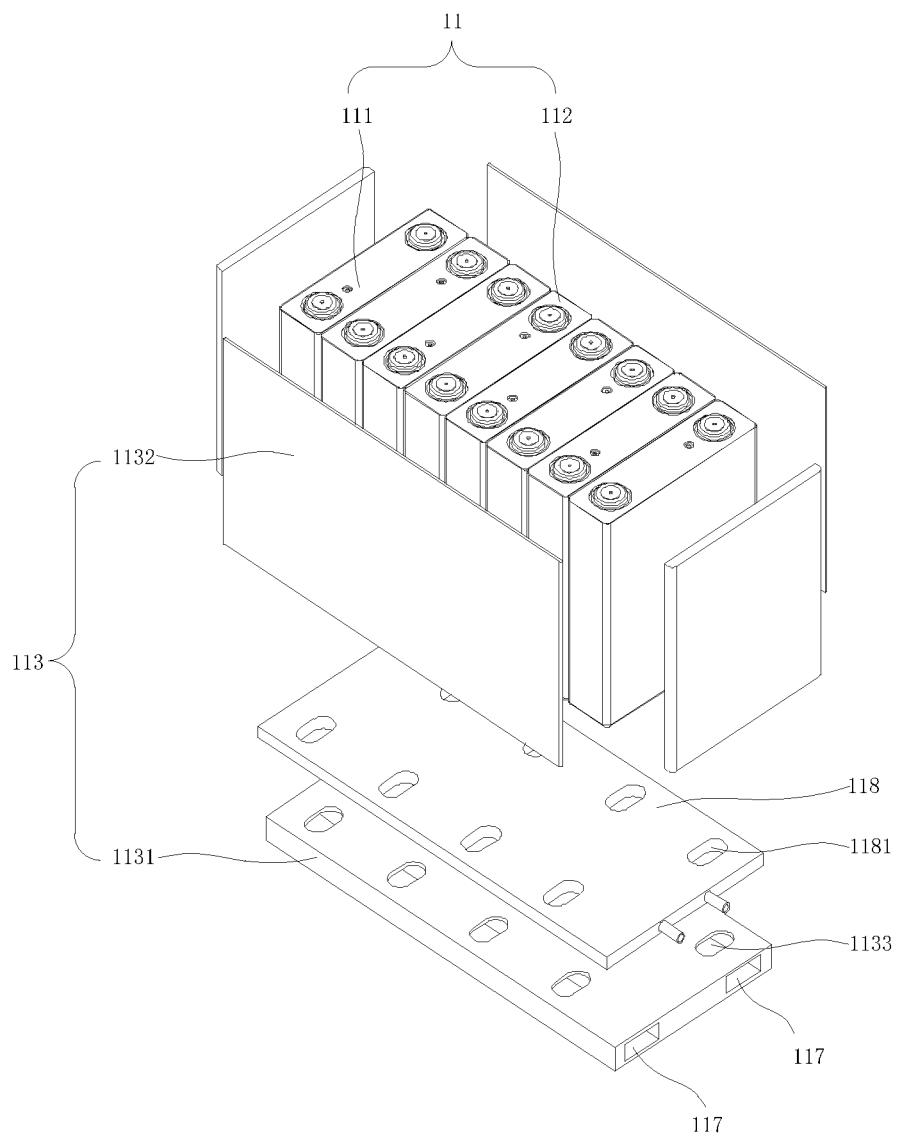
FIG. 14 is a third exploded view of a battery according to an embodiment of this application.

In some implementations, as shown in FIG. 5 and FIG. 14, the battery 11 further includes a box body 113. The box body 113 has a plurality of walls, the plurality of walls are configured to enclose an accommodating cavity for accommodating the first battery cell 111 and the second battery cell 112, a hollow cavity is provided in at least one of the plurality of walls, and the hollow cavity is configured to form the discharge channel 117. The box body 113 may be sealed or unsealed. In a specific example, the box body 113 includes a top wall (not shown) located on the top, a bottom wall 1131 located at the bottom, and a side wall 1132 located on a periphery of the bottom wall 1131, where the top wall and the bottom wall 1131 cover openings of two ends of the side wall 1132 respectively, so as to enclose the accommodating cavity together with the side wall 1132. Certainly, the side wall 1132 may be formed by connecting four sub-side walls end to end, or may be an integrated part. The box body 113 is configured to protect the first battery cell 111 and the second battery cell 112 that are arranged in the accommodating cavity. The hollow cavity for forming the discharge channel 117 is provided in at least one of the plurality of walls of the box body 113. This allows the first pressure relief mechanism 1111 of the first battery cell 111 and the second pressure relief mechanism 1121 of the second battery cell 112 to be disposed facing the respective hollow cavity, so that when the internal pressure or temperature of the first battery cell 111 reaches a threshold, emissions from the first battery cell 111 can be discharged to the hollow cavity, and when the internal pressure or temperature of the second battery cell 112 reaches a threshold, emissions from the second battery cell 112 can be discharged to the hollow cavity, so as to effectively reduce a risk of burning and explosion, thereby improving safety of the battery 11.

Further, the bottom wall 1131 is configured to support the first battery cell 111 and the second battery cell 112, and the bottom wall 1131 has a hollow inner cavity. Correspondingly, the first pressure relief mechanism 1111 of the first battery cell 111 and the second pressure relief mechanism 1121 of the second battery cell 112 are both arranged at the bottom of the respective housing 1114. In this way, emissions in the first battery cell 111 are discharged downwards and enter the hollow cavity at the bottom through the first pressure relief mechanism 1111, and emissions in the second battery cell 112 are also discharged downwards and enter the hollow cavity at the bottom through the second pressure relief mechanism 1121. With this arrangement of the battery 11, after the battery 11 is placed in a battery compartment of the vehicle 1, the battery 11 can discharge emissions to the bottom of the vehicle 1 rather than discharging emissions to a passenger compartment located above the battery compartment, thereby further improving safety of the battery 11.

In some implementations, to allow the emissions from the first battery cell 111 and the second battery cell 112 to be discharged to the discharge channel 117 effectively and timely, the first pressure relief mechanism 1111 of the first battery cell 111 and the second pressure relief mechanism 1121 of the second battery cell 112 are configured to communicate with the corresponding discharge channel 117. A communication manner of the first pressure relief mechanism 1111 of the first battery cell 111 and the hollow cavity forming the discharge channel 117 on the box body 113 and a communication manner of the second pressure relief mechanism 1121 of the second battery cell 112 and the hollow cavity forming the discharge channel 117 on the box body 113 are described in the following two implementations. It should be noted that the following two implementations are merely examples of two feasible implementations, but do not limit the communication manner of the first pressure relief mechanism 1111 of the first battery cell 111 and the hollow cavity and the communication manner of the second pressure relief mechanism 1121 of the second battery cell 112 and the hollow cavity.

In an implementation, at least one wall of the box body 113 of the battery 11 is configured to be broken when the first pressure relief mechanism 1111 is actuated, to allow the emissions from the first battery cell 111 to pass through the at least one wall and enter the corresponding discharge channel 117. In other words, the hollow cavity is provided in the at least one wall of the box body 113 that may be the top wall, the bottom wall 1131, or the side wall 1132. A part of the box body 113 facing the first pressure relief mechanism 1111 of the first battery cell 111 has a complete wall surface on the first pressure relief mechanism 1111. To be specific, a part of the box body 113 facing the first pressure relief mechanism 1111 of the first battery cell 111 does not have a hole structure communicating with the hollow cavity when the first pressure relief mechanism 1111 is not actuated. However, when the internal pressure or temperature of the first battery cell 111 reaches a threshold, the first pressure relief mechanism 1111 of the first battery cell 111 is actuated, and the emissions in the first battery cells 111 are discharged, the emissions discharged from the first battery cell 111 may act on the at least one wall of the box body 113 and cause the part of the box body 113 facing the pressure relief mechanism of the first battery cell 111 to be broken (destroyed or cracked), so that the interior of the hollow cavity of the box body 113 communicates with the first pressure relief mechanism 1111. In this way, the emissions in the first battery cell 111 can be discharged to the discharge channel 117 effectively and timely. Likewise, the at least one wall of the box body 113 of the battery 11 is configured to be broken when the second pressure relief mechanism 1121 is actuated, allowing the emissions from the second battery cell 112 to pass through the at least one wall and enter the corresponding discharge channel 117. The communication manner of the second pressure relief mechanism 1121 of the second battery cell 112 and the hollow cavity is the same as the communication manner of the first pressure relief mechanism 1111 of the first battery cell 111 and the hollow channel. Details are not described herein again.

In another implementation, a first through hole 1133 is provided in at least one wall of the box body 113 of the battery 11 that may be the top wall, the bottom wall 1131, or the side wall 1132. The first through hole 1133 is configured to communicate with the discharge channel 117, to allow the emissions from the first battery cell 111 to enter the discharge channel 117 through the first through hole 1133 when the first pressure relief mechanism 1111 is actuated. When the internal pressure or temperature of the first battery cell 111 reaches a threshold, the pressure relief mechanism of the first battery cell 111 is actuated, and the emissions in the first battery cell 111 are discharged, the emissions discharged from the first battery cell 111 enter the hollow cavity of the box body 113 through the first through hole 1133. In this way, the emissions in the first battery cell 111 can be discharged to the discharge channel 117 effectively and timely. Likewise, a first through hole 1133 is provided in at least one wall of the box body 113 of the battery 11 that may be the top wall, the bottom wall 1131, or the side wall 1132. The first through hole 1133 is configured to communicate with the discharge channel 117, to allow the emissions from the second battery cell to enter the discharge channel 117 through the first through hole 1133 when the second pressure relief mechanism 1121 is actuated. The communication manner of the second pressure relief mechanism 1121 of the second battery cell 112 and the hollow channel is the same as the communication manner of the first pressure relief mechanism 1111 of the first battery cell 111 and the hollow channel. Details are not described herein again.

The battery 11 further includes a thermal management part 118, configured to accommodate fluid to adjust temperature of the first battery cell 111 and the second battery cell 112. The thermal management part 118 is disposed between the first battery cell 111 and second battery cell 112 and the at least one wall. With arrangement of the thermal management part 118, temperature of the first battery cell 111 and the second battery cell 112 can be adjusted, so that the first battery cell 111 and the second battery cell 112 can be more efficiently and safely charged and discharged. The fluid herein may be liquid or gas. To adjust temperature means to heat or cool the first battery cell 111 and the second battery cell 112. In a case of cooling or lowering temperature of the first battery cell 111 and the second battery cell 112, the thermal management part 118 is configured to accommodate cooling fluid to lower temperature of the first battery cell 111 and the second battery cell 112. In this case, the thermal management part 118 may also be referred to as a cooling part, a cooling system, a cooling plate, or the like, and the fluid accommodated therein may also be referred to as a cooling medium or cooling fluid, and more specifically, cooling liquid or cooling gas. In addition, the thermal management part 118 may also be configured to accommodate heating fluid to raise temperature of the battery cell 111. This is not limited in the embodiments of this application. In some embodiments, the fluid may circulate, to implement a better temperature adjustment performance. In some embodiments, the fluid may be water, mixed liquid of water and glycol, air, or the like.

The thermal management part 118 is configured to be broken (destroyed or cracked) when the first pressure relief mechanism 1111 and/or the second pressure relief mechanism 1121 is actuated, to cause the fluid to flow out. To be specific, with the thermal management part 118, when the internal pressure or temperature of the first battery cell 111 and the second battery cell 112 reaches a threshold and a high-temperature and high-pressure gas needs to be released, emissions released by the first battery cell 111 and the second battery cell 112 act on the thermal management part 118 to destroy the thermal management part 118, so that the emissions from the first battery cell 111 and the second battery cell 112 can enter the discharge channel 117 (that is, the hollow cavity of the box body 113) through the destroyed thermal management part 118. In addition, because the thermal management part 118 is destroyed, the outflowing fluid such as cooling liquid absorbs a large amount of heat and is evaporated, so as to rapidly lower internal temperature of the battery 11, thereby helping relieve chain reaction of thermal failure, and improving safety of the battery 11.

Figure 15:
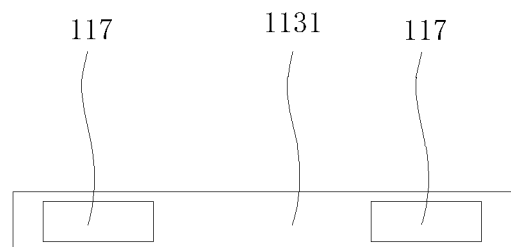
FIG. 15 is a first schematic structural diagram of a bottom wall according to an embodiment of this application.
Figure 16:
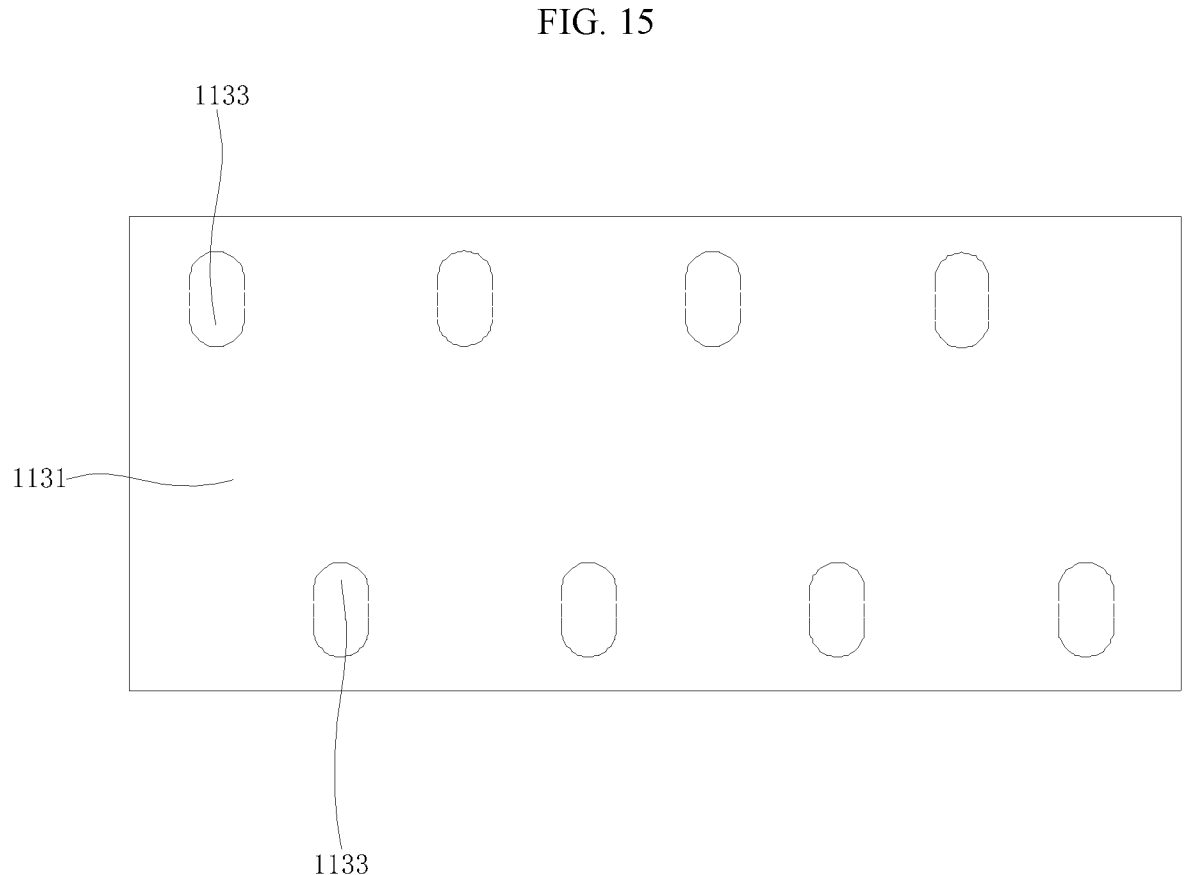
FIG. 16 is a second schematic structural diagram of a bottom wall according to an embodiment of this application.
Figure 17:
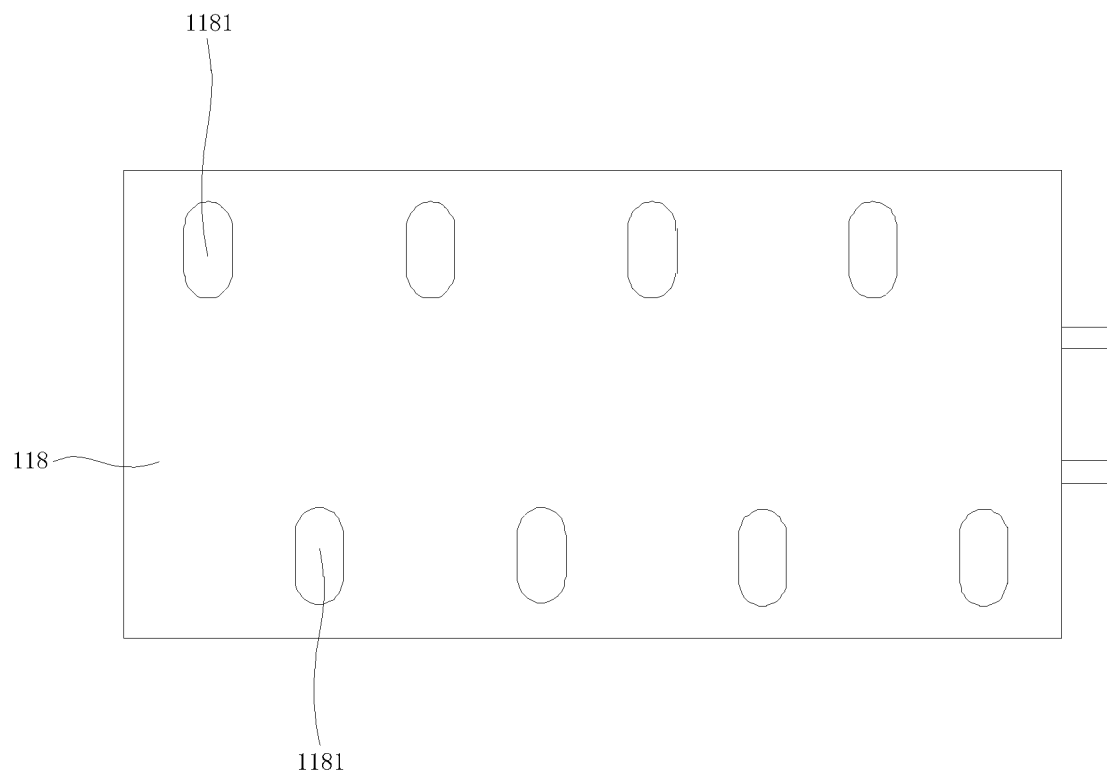
FIG. 17 is a schematic structural diagram of a thermal management part according to an embodiment of this application.
Figure 18:
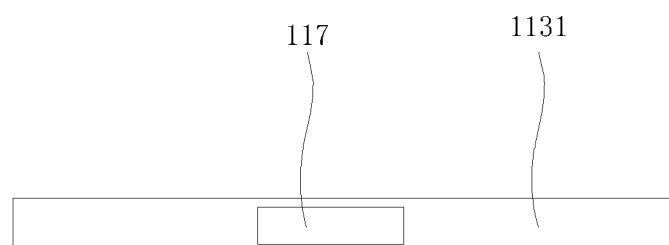
FIG. 18 is a first schematic structural diagram of a bottom wall according to another embodiment of this application.
Figure 19:
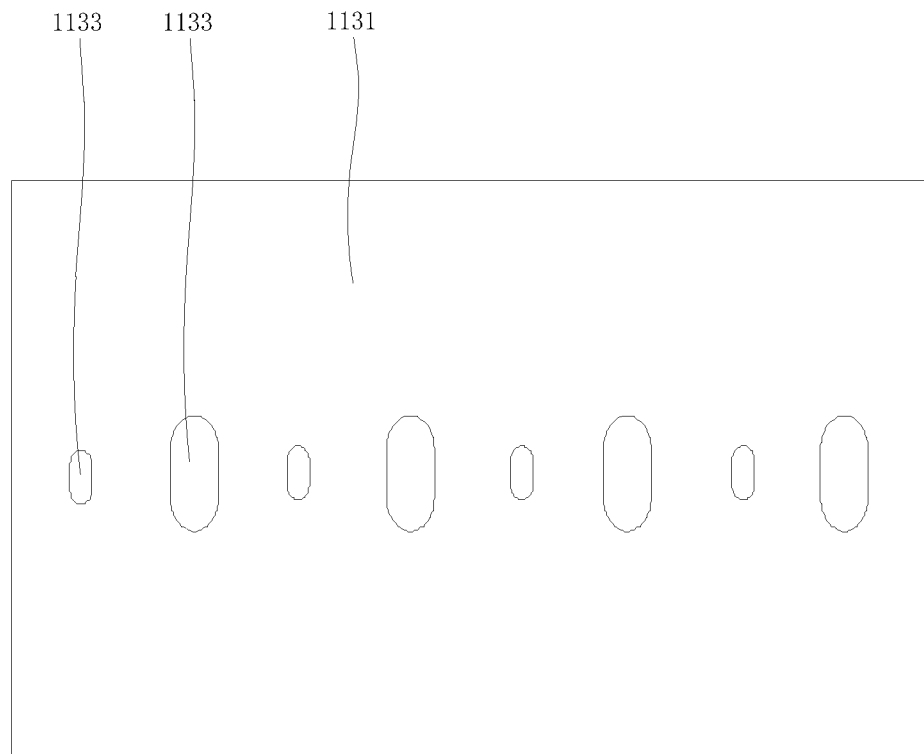
FIG. 19 is a second schematic structural diagram of a bottom wall according to another embodiment of this application.
Figure 20:
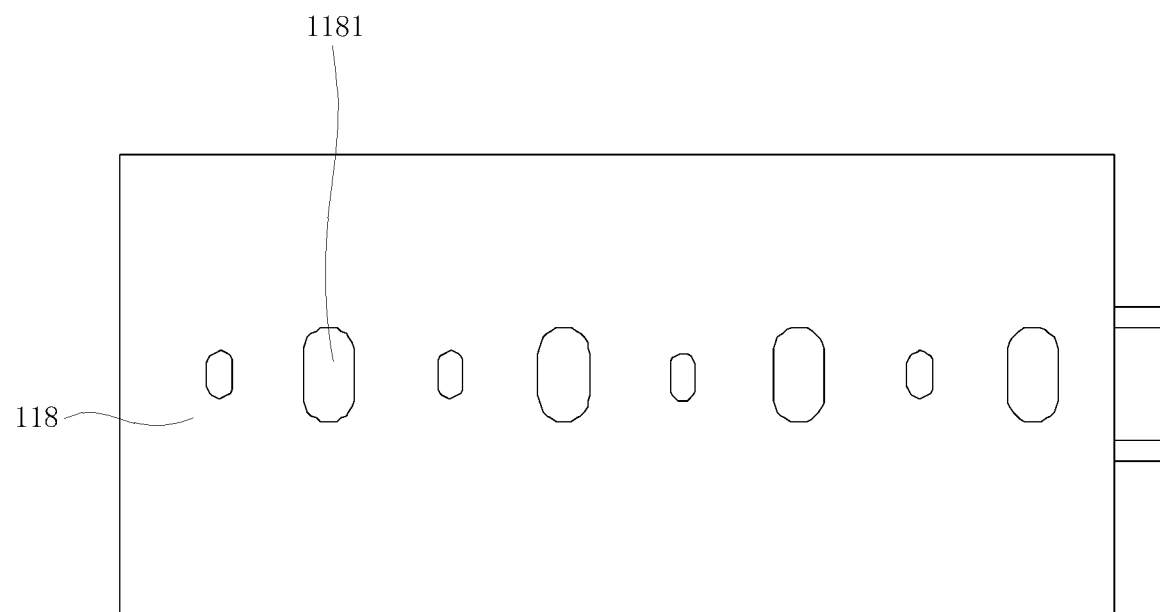
FIG. 20 is a schematic structural diagram of a thermal management part according to another embodiment of this application.

For example, as shown in FIG. 5 and FIG. 14, the thermal management part 118 is, for example, a water-cooled plate, a fluid channel is provided in the water-cooled plate, one end of the fluid channel forms a water inlet, and the other end of the water flow channel forms a water outlet. When the first battery cell 111 and the second battery cell 112 operate properly, water temperature in the water-cooled plate is adjusted to adjust ambient temperature of the first battery cell 111 and the second battery cell 112, so that the first battery cell 111 and the second battery cell 112 are charged and discharged within an appropriate temperature range, thereby improving charging efficiency and discharging efficiency of the battery 11. When thermal failure occurs in the first battery cell 111, or thermal failure occurs in the second battery cell 112, or thermal failure occurs in both the first battery cell 111 and the second battery cell 112, internal pressure released by the first battery cell 111 and the second battery cell 112 destroys the water-cooled plate, so that water in the water-cooled plate is evaporated to absorb heat of high-temperature gases released by the first battery cell 111 and the second battery cell 112, further reducing the probability of burning and explosion of the first battery cell 111 and the second battery cell 112, and improving safety of the battery 11. In some embodiments, a second through hole 1181 is provided in the thermal management part 118, and the second through hole 1181 is configured to communicate with the discharge channel 117, to allow the emissions from the first battery cell 111 and/or the second battery cell 112 to enter the corresponding discharge channel 117 through the second through hole 1181 when the first pressure relief mechanism 1111 and/or the second pressure relief mechanism 1121 is actuated. In some embodiments, an area of the second through hole 1181 may be set to be greater than or equal to an area of the first pressure relief mechanism 1111 disposed on the first battery cell 111, and/or greater than or equal to an area of the second pressure relief mechanism 1121 disposed on the second battery cell 112. Therefore, when the internal pressure or temperature of the first battery cell 111 reaches a threshold, the first pressure relief mechanism 1111 of the first battery cell 111 is actuated, and the emissions in the first battery cell 111 are discharged, the emissions discharged from the first battery cell 111 can rapidly and smoothly enter the discharge channel 117 (that is, the hollow cavity of the box body 113) through the second through hole 1181, so that the emissions in the first battery cell 111 can be discharged to the discharge channel 117 effectively and timely. Likewise, when the internal pressure or temperature of the second battery cell 112 reaches a threshold, the second pressure relief mechanism 1121 of the second battery cell 112 is actuated, and the emissions in the second battery cell 112 are discharged, the emissions discharged from the second battery cell 112 can rapidly and smoothly enter the discharge channel 117 (that is, the hollow cavity of the box body 113) through the second through hole 1171, so that the emissions in the second battery cell 112 can be discharged to the discharge channel 117 effectively and timely. Further, a first through hole 1133 is provided in at least one wall of the box body 113, and the first through hole 1133 is configured to communicate with the discharge channel 117. In this case, the second through hole 1181 communicates with the discharge channel 117 through the first through hole 1133. The emissions discharged by the first battery cell 111 and/or the second battery cell 112 enter the discharge channel 117 (that is, the hollow cavity of the box body 113) in sequence through the second through hole 1181 and the first through hole 1133. In this way, the emissions in the first battery cell 111 and the second battery cell 112 can be discharged to the discharge channel 117 effectively and timely. It should be noted that, in the foregoing implementation, the second through holes 1181 need to be in one-to-one correspondence with the first through holes 1133. For example, two discharge channels 117 are provided in a bottom wall 1131 shown in FIG. 15, a plurality of first through holes 1133 communicating with two discharge channels 117 are provided in a bottom wall 1131 shown in FIG. 16, and correspondingly, a plurality of second through holes 1181 in one-to-one correspondence with the first through holes 1133 are provided in a thermal management part 118 shown in FIG. 17. For example, a discharge channel 117 is provided in a bottom wall 1131 shown in FIG. 18, a plurality of first through holes 1133 communicating with one discharge channel 117 are provided in a bottom wall 1131 shown in FIG. 19, and correspondingly, a plurality of second through holes 1181 in one-to-one correspondence with the first through holes 1133 are provided in a thermal management part 118 shown in FIG. 20.

The foregoing has described the battery 11 in the embodiments of this application with reference to FIG. 1 to FIG. 20. The following will describe a preparation method and apparatus of battery 11 in the embodiments of this application. For a part that is not described in detail, reference may be made to the foregoing embodiments.

This embodiment provides a preparation method of battery, including the following steps:

configuring a first battery cell 111, where the first battery cell 111 includes a first pressure relief mechanism 1111, and the first pressure relief mechanism 1111 is configured to be actuated when internal pressure or temperature of the first battery cell 111 reaches a threshold, to release the internal pressure of the first battery cell 111; and configuring a second battery cell 112, where the second battery cell 112 includes a second pressure relief mechanism 1121, and the second pressure relief mechanism 1121 is configured to be actuated when internal pressure or temperature of the second battery cell 112 reaches a threshold, to release the internal pressure of the second battery cell 112; where an energy density of the first battery cell 111 is greater than an energy density of the second battery cell 112, and an area of the first pressure relief mechanism 1111 is greater than an area of the second pressure relief mechanism 1121.

In the preparation method of battery provided in this embodiment of this application, the first battery cell 111 with higher energy density and the second battery cell 112 with lower energy density are configured, and the area of the first pressure relief mechanism 1111 of the configured first battery cell 111 is limited to be greater than the area of the second pressure relief mechanism 1121 of the second battery cell 111. When thermal failure occurs in the first battery cell 111 and the second battery cell 112, even if thermal failure reaction of the first battery cell 111 is more violent than thermal failure reaction of the second battery cell 112, the first battery cell 111 with more violent failure reaction can release pressure effectively and timely by using the first pressure relief mechanism 1111 with a larger area, and the second battery cell 112 can release pressure effectively and timely by using the second pressure relief mechanism 1121, so as to effectively relieve a sharp rise in temperature of the first battery cell 111 and effectively reduce a probability of chain reaction triggered by thermal failure of the first battery cell 111, thereby improving overall safety of the battery 11.

An embodiment of this application provides a preparation apparatus of battery, including:

a first battery cell configuration module, configured to configure a first battery cell 111, where the first battery cell 111 includes a first pressure relief mechanism 1111, and the first pressure relief mechanism 1111 is configured to be actuated when internal pressure or temperature of the first battery cell 111 reaches a threshold, to release the internal pressure of the first battery cell 111; and a second battery cell configuration module, configured to configure a second battery cell 112, where the second battery cell 112 includes a second pressure relief mechanism 1121, and the second pressure relief mechanism 1121 is configured to be actuated when internal pressure or temperature of the second battery cell 112 reaches a threshold, to release the internal pressure of the second battery cell 112; where an energy density of the first battery cell 111 is greater than an energy density of the second battery cell 112, and an area of the first pressure relief mechanism 1111 is greater than an area of the second pressure relief mechanism 1121.

In the preparation apparatus of battery provided in the embodiments of this application, the first battery cell 111 with higher energy density is configured by the first battery cell configuration module and the second battery cell 112 with lower energy density are configured by the second battery cell configuration module, and the area of the configured first pressure relief mechanism 1111 of the first battery cell 111 is limited to be greater than the area of the second pressure relief mechanism 1121 of the second battery cell 112. When thermal failure occurs in the first battery cell 111 and the second battery cell 112, even if thermal failure reaction of the first battery cell 111 is more violent than thermal failure reaction of the second battery cell 112, the first battery cell 111 with more violent failure reaction can release pressure effectively and timely by using the first pressure relief mechanism 1111 with a larger area, and the second battery cell 112 can release pressure effectively and timely by using the second pressure relief mechanism 1121, so as to effectively relieve a sharp rise in temperature the first battery cell 111 and effectively reduce a probability of chain reaction triggered by thermal failure of the first battery cell 111, thereby improving overall safety of the battery 11.

The preparation apparatus of battery in this embodiment may be applied to the preparation method of battery in the foregoing embodiment. That is, the preparation method of battery in the foregoing embodiment may be specifically implemented by using the preparation apparatus of battery in this embodiment.

In conclusion, in the battery 11, the apparatus, the preparation method of battery, and the preparation apparatus of battery provided in this application, the area of the first pressure relief mechanism 1111 of the first battery cell 111 with higher energy density is limited to be greater than the area of the second pressure relief mechanism 1121 of the second battery cell 112 with lower energy density, so as to enable both the first battery cell 111 and the second battery cell 112 to release pressure effectively and timely, thereby improving overall safety of the battery 11.

The embodiments or implementations in this specification are described in a progressive manner, each embodiment focuses on differences from other embodiments. For the part that is the same or similar between different embodiments, reference may be made between the embodiments.

In the description of this specification, reference to the description of the terms "an implementation", "some implementations", "an example of the implementation", "an example", "a specific example", or "some examples" means that particular features, structures, materials or characteristics described in connection with the implementations or examples are included in at least one implementation or example of this application. In this specification, descriptions of examples of the above terms do not necessarily refer to the same implementation or example. Furthermore, the particular features, structures, materials, or characteristics described may be combined in a suitable manner in any one or more implementations or examples.

In conclusion, it should be noted that each foregoing embodiment is merely intended for describing the technical solutions of this application but not for limiting this application. Although this application is described in detail with reference to each foregoing embodiment, persons of ordinary skill in the art should understand that they may still make modifications to the technical solutions described in each foregoing embodiment or make equivalent replacements to some or technical features thereof, without departing from the scope of the technical solutions of each embodiment of this application.

What is claimed is:

1. A battery, comprising:
   a plurality of first battery cells, each first battery cell being provided with a first pressure relief mechanism configured to be actuated when internal pressure or temperature of the first battery cell reaches a threshold, to release the internal pressure of the first battery cell;
   a plurality of second battery cells, each second battery cell being provided with a second pressure relief mechanism configured to be actuated when internal pressure or temperature of the second battery cell reaches a threshold, to release the internal pressure of the second battery cell, the plurality of first battery cells and the plurality of second battery cells being arranged alternately along a first direction;
   a first discharge channel in a bottom wall of the battery and extending along the first direction, the first discharge channel being closer to a first side of the bottom wall than to a second side of the bottom wall that is opposite to the first side, and the plurality of first pressure relief mechanisms being disposed facing the first discharge channel in a second direction perpendicular to the first direction; and
   a second discharge channel in the bottom wall of the battery and extending along the first direction, the second discharge channel being closer to the second side of the bottom wall than to the first side of the bottom wall, and the plurality of second pressure relief mechanisms being disposed facing the second discharge channel in the second direction;
   wherein
   an energy density of the first battery cell is greater than an energy density of the second battery cell, and an area of the first pressure relief mechanism is greater than an area of the second pressure relief mechanism; and
   the first discharge channel is not connected to the second discharge channel.

2. The battery according to claim 1, wherein a ratio of the area A1 of the first pressure relief mechanism to the area A2 of the second pressure relief mechanism satisfies $1.5 \leq A1/A2 \leq 4$.

3. The battery according to claim 1, wherein a ratio of the energy density E1 of the first battery cell to the energy density E2 of the second battery cell satisfies $1.26 \leq E1/E2 \leq 2.14$.

4. The battery according to claim 1, wherein the plurality of first battery cells and the plurality of second battery cells are arranged alternately with n first battery cells followed by m second battery cells, wherein $n \geq 1$, and $m \geq 1$.

5. The battery according to claim 1, wherein the first discharge channel is configured to collect emissions from the first battery cell when the first pressure relief mechanism is actuated, and the second discharge channel is configured to collect emissions from the second battery cell when the second pressure relief mechanism is actuated, respectively.

6. The battery according to claim 1, wherein:
   the first pressure relief mechanisms of two adjacent ones of the plurality of first battery cells are disposed facing the first discharge channel and a third discharge channel, respectively; and/or
   the second pressure relief mechanisms of two adjacent ones of the plurality of second battery cells are disposed facing the second discharge channel and a fourth discharge channel, respectively.

7. The battery according to claim 5, wherein the battery further comprises a box body, wherein the box body has a plurality of walls, the plurality of walls are configured to enclose an accommodating cavity for accommodating the first battery cell and the second battery cell, a hollow cavity is provided in at least one of the plurality of walls, and the hollow cavity is configured to form the first discharge channel and the second discharge channel.

8. The battery according to claim 7, wherein the plurality of walls comprise a bottom wall, the bottom wall is configured to support the plurality of first battery cells and the plurality of second battery cells, and the hollow cavity is provided in the bottom wall.

9. The battery according to claim 7, wherein the at least one wall is configured to be broken when the first pressure relief mechanism and/or the second pressure relief mechanism is actuated, to cause the emissions from the first battery cell and/or the second battery cell to pass through the at least one wall and enter a corresponding discharge channel of the first discharge channel and the second discharge channel.

10. The battery according to claim 7, wherein a first through hole is provided in the at least one wall, and the first through hole is configured to communicate with the first discharge channel and the second discharge channel, to cause the emissions from the first battery cell and/or the second battery cell to enter a corresponding discharge channel of the first discharge channel and the second discharge channel through the first through hole when the first pressure relief mechanism and/or the second pressure relief mechanism is actuated.

11. The battery according to claim 7, wherein the battery further comprises a thermal management part, configured to accommodate fluid to adjust temperature of the first battery cell and the second battery cell, the thermal management part is disposed between the first battery cell and second battery cell and the at least one wall, and the thermal management part is configured to be broken when the first pressure relief mechanism and/or the second pressure relief mechanism is actuated, to cause the fluid to flow out.

12. The battery according to claim 11, wherein a second through hole is provided in the thermal management part, and the second through hole is configured to communicate with the first discharge channel and the second discharge channel, to cause the emissions from the first battery cell and/or the second battery cell to enter a corresponding discharge channel of the first discharge channel and the second discharge channel through the second through hole when the first pressure relief mechanism and/or the second pressure relief mechanism is actuated.

13. The battery according to claim 12, wherein the second through hole communicates with the first discharge channel and the second discharge channel through the first through hole.

14. An apparatus, comprising the battery according to claim 1, wherein the battery is configured to supply electric energy for the apparatus.

15. The battery according to claim 1, wherein the first pressure relief mechanism is configured to be actuated when the temperature of the first battery cell reaches the threshold, and the second pressure relief mechanism is configured to be actuated when the temperature of the second battery cell reaches the threshold.

16. The battery according to claim 1, wherein:

the first pressure relief mechanism includes a first temperature sensitive component; and the second pressure relief mechanism includes a second temperature sensitive component.

17. The battery according to claim 1, further comprising:

a heat insulating member provided between the first battery cell and the second battery cell, the heat insulating member including at least one of foam, rubber, heat-insulating wool, or aerogel heat-insulating pad.

18. The battery according to claim 1, further comprising:

a thermal management part configured to accommodate fluid and provided with a through hole, the through hole being configured to communicate with the first discharge channel and the second discharge channel, and an area of the through hole being greater than an area of the first pressure relief mechanism.

* * * * *